(12) United States Patent
Pfaller

(10) Patent No.: US 12,390,873 B2
(45) Date of Patent: Aug. 19, 2025

(54) SYSTEMS AND METHODS TO CONTROL WELDING-TYPE POWER SUPPLIES USING AC WAVEFORMS AND/OR DC PULSE WAVEFORMS

(71) Applicant: Illinois Tool Works Inc., Glenview, IL (US)

(72) Inventor: Andrew Pfaller, Hilbert, WI (US)

(73) Assignee: Illinois Tool Works Inc., Glenview, IL (US)

( * ) Notice: Subject to any disclaimer, the term of this patent is extended or adjusted under 35 U.S.C. 154(b) by 271 days.

(21) Appl. No.: 17/066,806

(22) Filed: Oct. 9, 2020

(65) Prior Publication Data

US 2021/0129251 A1 May 6, 2021

Related U.S. Application Data

(60) Provisional application No. 62/929,252, filed on Nov. 1, 2019.

(51) Int. Cl.
*B23K 9/09* (2006.01)
*B23K 9/095* (2006.01)

(52) U.S. Cl.
CPC ............ *B23K 9/093* (2013.01); *B23K 9/0953* (2013.01)

(58) Field of Classification Search
CPC ........ B23K 9/09; B23K 9/095; B23K 9/0953; B23K 9/0956; B23K 9/10; B23K 9/1056
See application file for complete search history.

(56) References Cited

U.S. PATENT DOCUMENTS

| | | | |
|---|---|---|---|
| 5,473,139 A * | 12/1995 | Matsui | B23K 9/092 219/130.51 |
| 6,335,511 B1 | 1/2002 | Rothermel | |
| 8,993,925 B2 * | 3/2015 | Fujiwara | B23K 9/125 219/130.33 |

(Continued)

FOREIGN PATENT DOCUMENTS

| | | |
|---|---|---|
| CN | 1453927 | 11/2003 |
| CN | 105531063 | 4/2016 |

OTHER PUBLICATIONS

Canadian Office Action Appln No. 3,096,648 dated Oct. 28, 2021.
(Continued)

*Primary Examiner* — Ibrahime A Abraham
*Assistant Examiner* — Joe E Mills, Jr.
(74) *Attorney, Agent, or Firm* — McAndrews, Held & Malloy, Ltd.

(57) ABSTRACT

An example welding-type power supply includes: power conversion circuitry configured to convert input power to welding-type power having at least one of an alternating current (AC) waveform or a pulse waveform; an interface configured to receive an input representative of a selected frequency of the AC waveform or the pulse waveform; and control circuitry configured to: determine an amperage parameter of the welding-type power; based on the amperage parameter, determine a range of frequencies of the AC waveform or the pulse waveform; control the interface to output an indication of the selected frequency with respect to the determined range of frequencies; and control the power conversion circuitry to output the welding-type power at the selected frequency and based on the amperage parameter.

20 Claims, 14 Drawing Sheets

(56) References Cited

U.S. PATENT DOCUMENTS

| | | |
|---|---|---|
| 9,776,273 B2 | 10/2017 | Fujiwara |
| 2004/0251910 A1 | 12/2004 | Smith |
| 2005/0189334 A1 | 9/2005 | Stava |
| 2007/0170164 A1 | 7/2007 | Nadzam |
| 2008/0245775 A1* | 10/2008 | Opderbecke .......... B23K 9/167 219/121.45 |
| 2009/0071949 A1* | 3/2009 | Harris ................ B23K 9/1062 219/130.1 |
| 2010/0133250 A1* | 6/2010 | Sardy .................. B23K 9/125 219/130.31 |
| 2010/0237052 A1* | 9/2010 | Daniel ................ B23K 9/0953 219/136 |
| 2011/0114611 A1 | 5/2011 | Cole |
| 2011/0204033 A1 | 8/2011 | Schartner |
| 2012/0006800 A1* | 1/2012 | Ryan .................. B23K 9/0953 219/130.21 |
| 2012/0241429 A1 | 9/2012 | Knoener |
| 2013/0226479 A1* | 8/2013 | Grosjean ............... G01R 31/52 702/58 |
| 2014/0110385 A1* | 4/2014 | Hearn .................. B23K 9/091 219/130.1 |
| 2014/0251969 A1 | 9/2014 | Stoner et al. |
| 2014/0251971 A1 | 9/2014 | Hearn |
| 2015/0041449 A1 | 2/2015 | Fujiwara |
| 2015/0076129 A1 | 3/2015 | Spear |
| 2016/0167152 A1* | 6/2016 | Ulrich ................ B23K 9/1006 219/130.32 |
| 2017/0036288 A1 | 2/2017 | Albrecht |
| 2017/0165775 A1 | 6/2017 | Knoener |
| 2017/0225254 A1* | 8/2017 | Ulrich ................ B23K 9/0953 |
| 2018/0050412 A1 | 2/2018 | Kadlec |
| 2019/0015922 A1 | 1/2019 | Inoue |
| 2019/0070689 A1 | 3/2019 | Bunker |

OTHER PUBLICATIONS

Canadian Office Action Appln No. 3,096,651 dated Oct. 28, 2021.
European Office Communication Appln No. 20203385.8 dated Apr. 8, 2021.

* cited by examiner

SYSTEMS AND METHODS TO CONTROL WELDING-TYPE POWER SUPPLIES USING AC WAVEFORMS AND/OR DC PULSE WAVEFORMS

BACKGROUND

This disclosure relates generally to welding-type systems using repeated waveforms and, more particularly, to systems and methods to control welding-type power supplies using AC waveforms and/or DC pulse waveforms.

SUMMARY

Systems and methods to control welding-type power supplies using AC waveforms and/or DC pulse waveforms are disclosed, substantially as illustrated by and described in connection with at least one of the figures, as set forth more completely in the claims.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
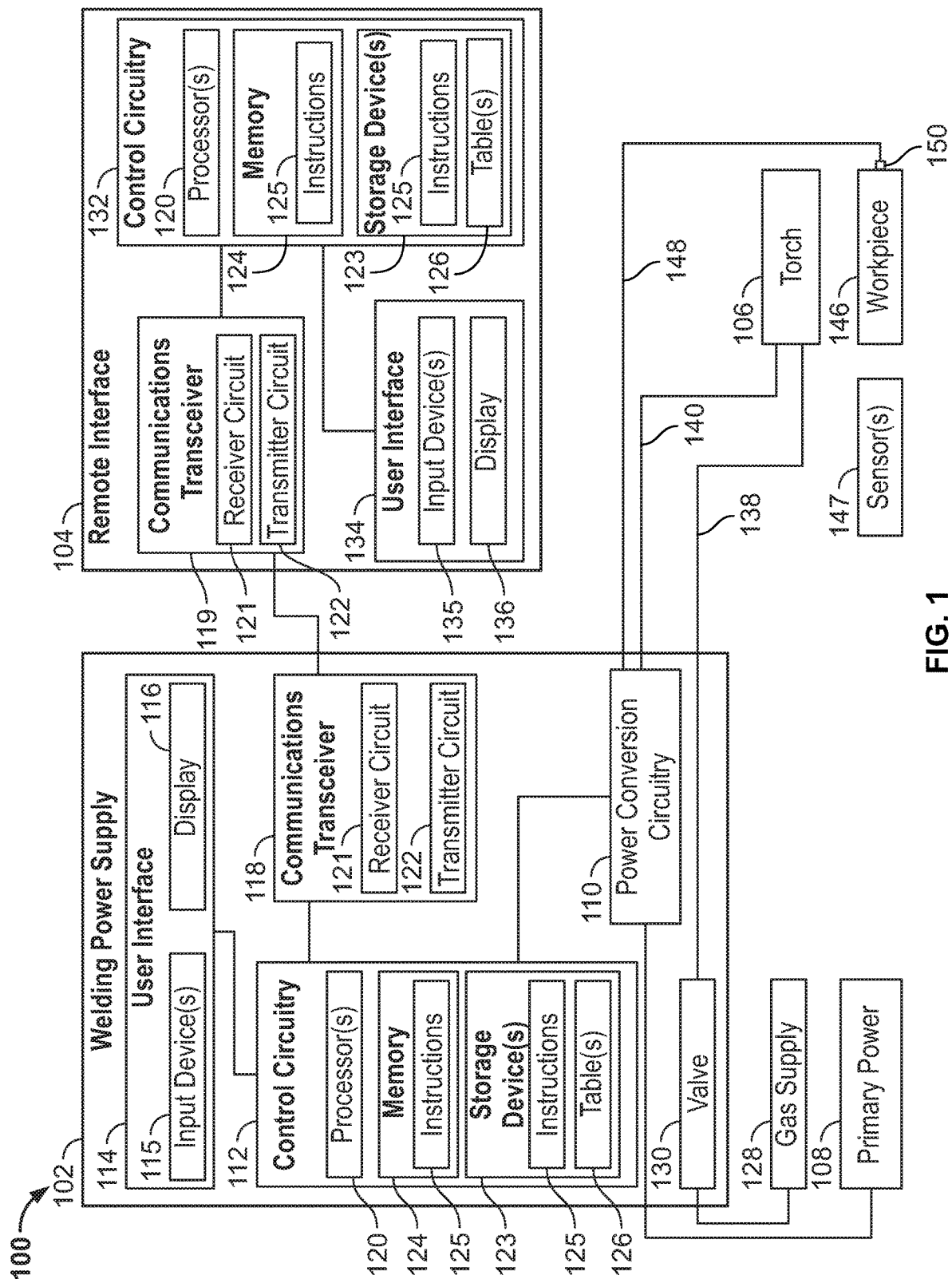
FIG. 1 is a schematic diagram of an example welding system including a welding-type power supply configured to output welding-type power, in accordance with aspects of this disclosure.

Gas tungsten arc welding (GTAW), also referred to as TIG welding, enable weld operators to use cyclic waveforms that repeat based on a selected frequency and/or non-cyclic waveforms that occur based on the selected frequency. For example, an operator may select a frequency of an AC waveform and/or a number of pulses per second for an AC or DC pulse waveform (referred to herein as the "frequency" of the DC pulse waveform. Conventional welding-type power supplies enable operators to select the frequency within the capabilities of the welding-type power supply. However, the resistance and/or inductance of the welding circuit can result in poor welding performance in certain ranges of parameters and/or combinations of parameters.

As used herein, "amperage" refers to an amount of welding-type current, and may include an instantaneous current, an average current, an RMS current, a peak current, an electrode negative (EN) current, and/or an electrode positive (EP) current.

Disclosed methods and apparatus reduce the likelihood of poor welding conditions when using AC and/or DC pulse waveforms by 1) automatically selecting one or more AC and/or DC pulse parameters in response to changes in other parameter(s), and/or 2) providing an indication to an operator of a selected or modified parameter value with respect to an empirically determined acceptable range of values for the selected or modified parameter. In some examples, the welding power supply stores one or more tables, algorithms, and/or other data representative of predetermined relationships between the waveform frequency and amperage parameter(s). The predetermined relationships may include 1) 1:1 corresponding relationships between amperage and frequency to automatically select frequency based on amperage, 2) preferred or optimal combinations of frequencies and amperages (e.g., ranges of frequencies for a given amperage, ranges of amperages for a given frequency, etc.) 3) acceptable (e.g., less effective, less preferred) combinations of frequencies and amperages, and/or 4) unacceptable or disallowed combinations of frequencies and amperages. The relationships, combinations, and/or ranges may be selected based on other parameters or conditions (e.g., measured inductance, waveform type, etc.).

In some example systems and methods, a frequency of the AC and/or pulse waveform is automatically controlled or selected based on a commanded amperage parameter, such as a target current. The dependency of the frequency on the commanded amperage parameter may be based on an average current, an RMS current, a peak current, an electrode negative (EN) current, and/an electrode positive (EP) current. Additionally or alternatively, the amperage may be controlled or selected based on the commanded frequency.

In some examples, the frequency is automatically and synchronously adjusted in response to changes to preset amperages (e.g., via an operator interface, via remote control, etc.). Additionally or alternatively, the welding system may enable the operator to select one of multiple dependency levels (e.g., low, medium, high), in which different dependency levels have a different relationship (e.g., slope) between the amperage and the frequency.

While lower frequencies and/or lower currents are less likely to be adversely affected by inductance of the welding circuit than higher frequencies and/or higher currents, lower frequencies can result in poor welding performance. Some example systems and methods apply a lower limit to the frequency. Additionally or alternatively, the welding power supply may apply an upper limit to the frequency to avoid operating in amperage and frequency ranges that exceed the ability of the power supply to drive current as required by the waveform.

In some examples, the frequency and/or the amperage may be controlled based on additional parameters, such as a pulse peak current time, a pulse peak current percentage, a pulse background current time, a pulse background current percentage, an AC waveform type, or a weld circuit inductance. The additional parameters may be reflected in the predetermined relationships stored in the welding power supply for control and/or notifications.

In addition or as an alternative to automatically controlling the frequency based on the amperage parameter (and/or vice versa), example systems and methods may output an indication of a selected frequency (or amperage) with respect to range of frequencies determined based on the amperage (or frequency).

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include power limiting circuitry, output selection circuitry, measurement and/or control circuitry, and/or any other circuits to provide appropriate features.

As used herein, the terms "first" and "second" may be used to enumerate different components or elements of the same type, and do not necessarily imply any particular order. For example, while in some examples a first time occurs prior to a second time within a time period, the terms "first time" and "second time" do not imply any specific order in which the first or second times occur relative to the other within the time period.

The term "welding-type system," as used herein, includes any device capable of supplying power suitable for welding, plasma cutting, induction heating, Carbon Arc Cutting-Air (e.g., CAC-A) and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

Disclosed example welding-type power supplies include: power conversion circuitry configured to convert input power to welding-type power having at least one of an alternating current (AC) waveform or a pulse waveform, an interface configured to receive an input representative of a selected frequency of the AC waveform or the pulse waveform, and control circuitry configured to: determine an amperage parameter of the welding-type power; based on the amperage parameter, determine a range of frequencies of the AC waveform or the pulse waveform; control the interface to output an indication of the selected frequency with respect to the determined range of frequencies; and control the power conversion circuitry to output the welding-type power at the selected frequency and based on the amperage parameter.

In some examples, each cycle of the AC waveform comprises an electrode negative portion and an electrode positive portion. In some example welding-type power supplies, the amperage parameter includes at least one of an average current, a root-mean-square (RMS) current, a peak current, an electrode negative peak current, an electrode negative commutation current, an electrode positive peak current, or an electrode positive commutation current.

In some example welding-type power supplies, the interface is configured to receive the amperage parameter. In some example welding-type power supplies, the control circuitry is configured to limit the selection of the frequency via the operator interface, based on at least one of an upper frequency limit or a lower frequency limit. Some example welding-type power supplies further include an output device configured to output a notification in response to determining that a difference between the selected frequency and a frequency limit is less than a threshold difference.

In some example welding-type power supplies, the control circuitry is configured to determine an inductance of a welding-type circuit to which the power conversion circuitry is coupled to output the welding-type power, and the control circuitry is configured to determine the frequency based on the amperage parameter and the determined inductance. In some example welding-type power supplies, the control circuitry is configured to determine at least one of a pulse peak current time, a pulse peak current percentage, a pulse background current time, a pulse background current percentage, an AC waveform type, or a weld circuit inductance, wherein the control circuitry is configured to determine the frequency based on the amperage parameter and at least one of the pulse peak current time, the pulse peak current percentage, the pulse background current time, the pulse background current percentage, the AC waveform type, or the weld circuit inductance.

In some example welding-type power supplies, each cycle of the pulse waveform comprises a peak current and a background current. In some example welding-type power supplies, the control circuitry is configured to determine the range of frequencies of the AC waveform or the pulse waveform based on a selected one of a plurality of predetermined relationships between the frequency and the amperage parameter.

Some disclosed example welding-type power supplies include: power conversion circuitry configured to convert input power to welding-type power having at least one of an alternating current (AC) waveform or a pulse waveform, an interface configured to receive an input representative of a selected amperage, and control circuitry configured to: determine a frequency of the AC waveform or the pulse waveform; based on the frequency of the AC waveform or the pulse waveform, determine an amperage range; control the interface to output an indication of the selected amperage with respect to the determined amperage range; and control the power conversion circuitry to output the welding-type power at the selected amperage and based on the frequency.

In some examples, each cycle of the AC waveform comprises an electrode negative portion and an electrode positive portion. In some example welding-type power supplies, the amperage parameter includes at least one of an average current, a root-mean-square (RMS) current, a peak current, an electrode negative peak current, an electrode negative commutation current, an electrode positive peak current, or an electrode positive commutation current.

In some example welding-type power supplies, the interface is configured to receive the frequency. In some example welding-type power supplies, the control circuitry is configured to limit the selection of the amperage via the operator interface, based on at least one of an upper amperage limit or a lower amperage limit. Some example welding-type power supplies further include an output device configured to output a notification in response to determining that a difference between the selected amperage and an amperage limit is less than a threshold difference.

In some example welding-type power supplies, the control circuitry is configured to determine an inductance of a welding-type circuit to which the power conversion circuitry is coupled to output the welding-type power, and the control circuitry is configured to determine the amperage based on the frequency and the determined inductance. In some example welding-type power supplies, the control circuitry is configured to determine at least one of a pulse peak current time, a pulse peak current percentage, a pulse background current time, a pulse background current percentage, an AC waveform type, or a weld circuit inductance, wherein the control circuitry is configured to determine the amperage based on the frequency and at least one of the pulse peak current time, the pulse peak current percentage, the pulse background current time, the pulse background current percentage, the AC waveform type, or the weld circuit inductance.

In some example welding-type power supplies, each cycle of the pulse waveform comprises a peak current and a background current. In some example welding-type power supplies, the control circuitry is configured to determine the amperage range of the AC waveform or the pulse waveform based on a selected one of a plurality of predetermined relationships between the frequency and the amperage parameter.

Turning now to the drawings, FIG. 1A is a block diagram of an example welding system 100 having a welding-type power supply 102, a remote interface 104, and a welding torch 106. The welding system 100 powers, controls, and/or supplies consumables to a welding application. In the example of FIG. 1, the power supply 102 directly supplies welding-type output power to the welding torch 106. The welding torch 106 is configured for gas tungsten arc welding (GTAW), which may be used to perform welding processes involving DC welding-type current, pulsed DC welding-type current waveforms, and/or AC waveforms. Example DC pulse waveforms that may be output by the power supply 102 have a peak phase at a peak current and a background phase at a background current, and one pulse cycle includes one peak phase and one background phase.

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a target amperage (e.g., a weld current setpoint) and outputs the welding-type power via a weld circuit.

The power supply 102 includes control circuitry 112 to control the operation of the power supply 102. The power supply 102 also includes a user interface 114. The control circuitry 112 receives input from the user interface 114, through which a user may choose a process and/or input desired parameters (e.g., a voltage, a current, a frequency, pulse peak current time, a pulse peak current percentage, a pulse background current time, a pulse background current percentage, an AC waveform type, an AC balance, a weld circuit inductance, etc.). The user interface 114 may receive inputs using one or more input devices 115, such as via a keypad, keyboard, physical buttons, switches, knobs, a mouse, a keyboard, a keypad, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator.

Similarly, the example remote interface 104 may include a user interface 134 having one or more input device(s) 135 and a display 136. The user interface 134, the input device(s) 135, and/or the display 136 may be similar, identical, or different than the user interface 114, the input device(s) 115, and/or the display 116.

The control circuitry 112 may also include interface circuitry for communicating data to other devices in the system 100, such as the remote interface 104. For example, in some situations, the power supply 102 wirelessly communicates with the remote interface 104. Further, in some situations, the power supply 102 communicates with the remote interface 104 using a wired connection, such as by using a network interface controller (NIC) to communicate data via a network (e.g., ETHERNET, 10baseT, 10base100, etc.), and/or. In some examples, the control circuitry 112 communicates with the remote interface 104 via the weld circuit.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include predetermined relationships between frequency and amperage, such as one or more look up tables, as described in more detail below.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 138 (which in some implementations may be packaged with the welding power output) to the welding torch 106, which provides the shielding gas to the welding application. In some examples, the welding system 100 does not include the gas supply 128, the valve 130, and/or the cable 138.

In the example of FIG. 1, the power supply 102 includes a communications transceiver 118, and the remote interface 104 includes a communications transceiver 119. The communications transceivers 118, 119 each include a corresponding receiver circuit 121 and a corresponding transmitter circuit 122. The example communications transceivers 118, 119 enable the remote interface 104 to transmit commands to the power supply 102 and/or receive information from the power supply 102. Example commands may include commands to set parameters and/or otherwise configure the power supply 102. The remote interface 104 may receive information about the configuration of the power supply 102.

The remote interface 104 further includes control circuitry 132, which may include one or more processor(s) 120, one or more storage device(s) 123, and/or memory 124, and/or may store and execute machine readable instructions 125. The control circuitry 132, the processor(s) 120, the storage device(s) 123, and/or the memory 124 may be similar, identical, or different than the control circuitry 112, the processor(s) 120, the storage device(s) 123, and/or the memory 124 of the power supply 102.

The welding torch 106 delivers the welding power and/or shielding gas for a welding application. The welding torch 106 is used to establish a welding arc between the welding torch 106 and a workpiece 146. A welding cable 140 couples the torch 106 to the power conversion circuitry 110 to conduct current to the torch 106. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146.

In some examples, one or more sensors 147 are included with or connected to the welding torch 106 to monitor one or more welding parameters (e.g., power, voltage, current, inductance, impedance, etc.) to inform the control circuitry 132 and/or 112 during the welding process.

To aid a weld operator in configuring the welding-type power supply 102 appropriately (e.g., welding parameters) for an AC waveform or DC pulse process, the example storage device(s) 123 may store tables 126 or other data representative of relationships between frequency and amperage. The tables 126 may define the relationships for different values of other parameters, such as welding circuit inductance, waveform characteristics (e.g., AC waveform shape, peak and/or background current and/or dwell time for pulse, etc.), and/or any other variables. The example tables 126 may be populated based on empirical testing using different combinations of welding parameters.

Figure 2A:
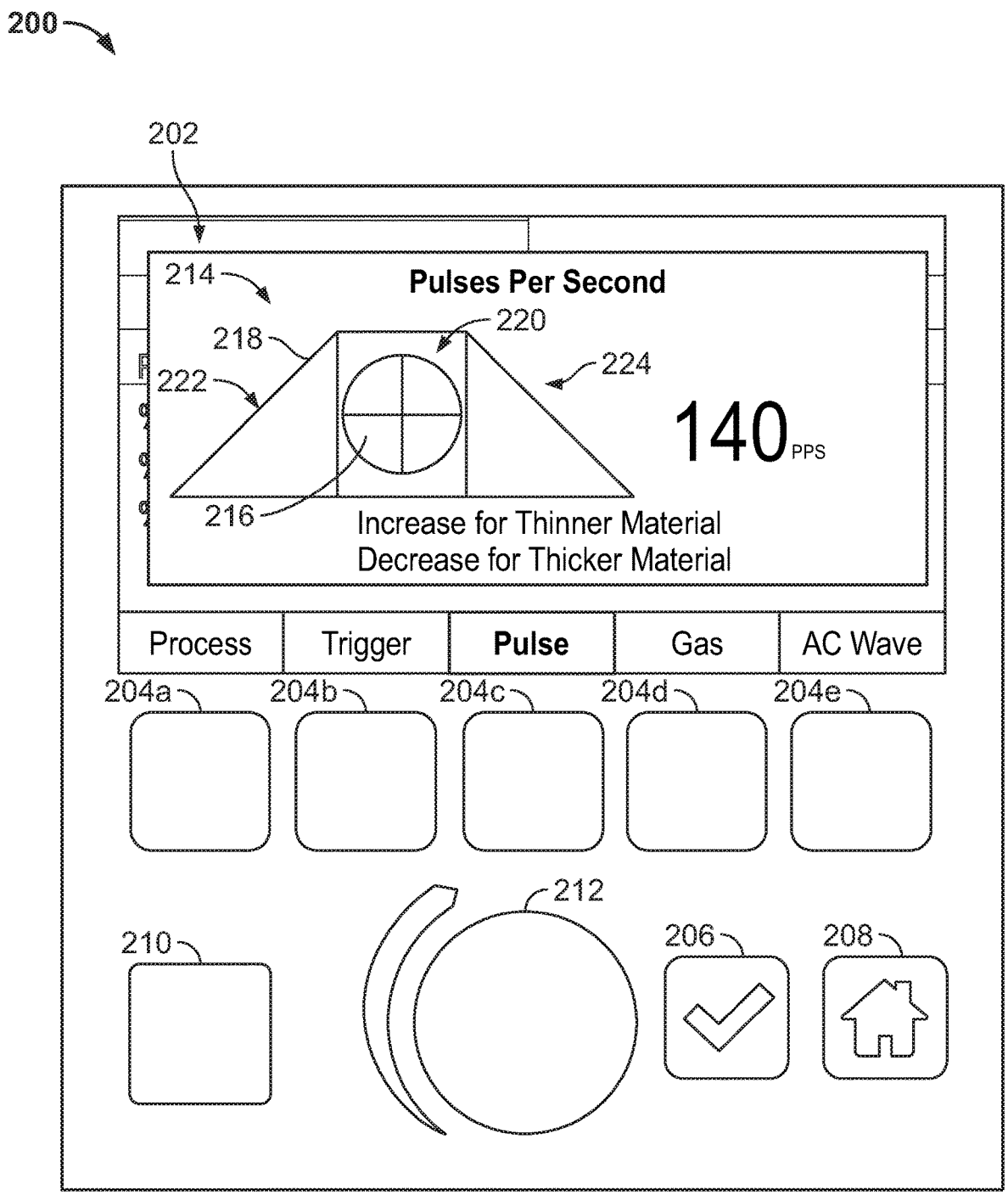
FIG. 2A is an example user interface that may implement the user interface of FIG. 1 to enable an operator to adjust one or more parameters of a welding-type output waveform, and/or to output an indication of a selected parameter with respect to a determined range of parameters.

FIG. 2A is an example user interface 200 that may implement the user interface 114, 134 of FIG. 1 to enable an operator to adjust one or more parameters of a welding-type output waveform, and/or to output an indication of a selected parameter with respect to a determined range of parameters. The example user interface 200 of FIG. 2A includes a display 202, input buttons 204a-204e, 206, 208, 210, and an input knob 212. The example buttons 204a-204e, 206, 208, 210, and the input knob 212 may implement the input devices 115, 135 of FIG. 1.

The example buttons 204a-204e enable an operator to select one or more weld parameters for adjustment or recall (e.g., by recalling a weld schedule or stored set of parameters). Once a parameter is selected, the example knob 212 receives inputs to change the value of the parameter, such as by increasing (e.g., incrementing) or decreasing (e.g., decrementing) a value of a parameter and/or selecting between discrete values of a parameter. For example, an operator may turn the knob 212 to select an AC waveform or a DC pulse process, to change a welding amperage, change an AC or DC pulse frequency, and/or to change any other parameters.

The button 208 may be selected to confirm a selected parameter. The button 208 enables navigation, such as by canceling a parameter change and/or reverting to a prior menu.

The example button 210 may be selected to enable or disable an automatic configuration mode, in which the control circuitry 112, 132 automatically configures one or more parameters in response to changes in one or more other parameters. For example, when the automatic configuration mode is selected, the control circuitry 112, 132 may respond to changes in an amperage parameter (e.g., received via the knob 212) with corresponding changes to a frequency for AC and/or DC pulse processes. Similarly, the control circuitry 112, 132 may respond to changes in the frequency parameter by automatically configuring the amperage. To determine automatic changes, the example control circuitry 112, 132 accesses a predetermined relationship stored in the storage device(s) 123 and/or memory 124, such as a relationship between amperage and frequency. The predetermined relationship may be selected from multiple predetermined relationships based on other selected parameters, such as the type of welding process (e.g., AC, DC pulse), measured inductance, and/or any other parameters. The operator may be permitted to change the parameter from the automatically configured value, or may be prevented from making changes to an automatically configured value without disabling the automatic configuration mode.

When the automatic configuration mode is disabled (or deselected), the control circuitry 112, 132 permits the parameters specified in the predetermined relationships to be set independently. For example, the control circuitry 112, 132 does not change the frequency based on changes to the amperage, and does not change the amperage based on changes to the frequency.

In the example of FIG. 2A, the display 202 presents a graphic 214 that indicates the selected value of a parameter (e.g., the frequency) with respect to a range of frequencies. The example graphic 214 includes an indicator 216 within a trapezoid 218 representing the range of values. The center portion 220 of the trapezoid represents a preferred or optimal value of the parameter, according to the selected predetermined relationship. The left portion 222 and the right portion 224 of the trapezoid 218 represent deviations of the parameter value from the value represented by the center portion 220. As the value of the parameter is modified (e.g., via the knob 212), the control circuitry 112, 132 updates the graphic 214 to move the indicator 216 within the trapezoid 218 based on the value of the parameter with respect to the range.

In the example of FIG. 2A, the left portion 222 and the right portion 224 may have different characteristics, such as different colors or patterns, to indicate the relative advantages or disadvantages of the corresponding parameter range. For example, the right portion 224 representing a higher frequency for a given amperage may be colored a color associated with caution or disadvantage to indicate that the right portion 224 represents a disadvantageous frequency range. Conversely, the left portion 222 representing a lower frequency for the given amperage may be colored a color associated with acceptability to indicate that, while not the preferred range, the left portion 222 represents an acceptable range.

In addition to the graphic 214, the example display 202 may also display the selected value of the parameter numerically, and/or may display information to guide the operator to make changes to the selected value (e.g., increase parameter for thinner materials, decrease parameter for thicker materials).

The range of frequencies represented by the graphic 214 may be determined based on another parameter (e.g., amperage) specified in the stored predetermined relationships. For example, when the amperage parameter is selected, the control circuitry 112, 132 automatically determines a range of frequencies. The range of frequencies may include only preferred frequencies, or may include less preferred, but acceptable frequencies.

In the example of FIG. 2A, the determined range does not include frequencies that have been set in the stored predetermined relationships. In some examples, an operator may be prevented by the control circuitry 112, 132 from setting the value of the frequency parameter outside of the acceptable range.

Figure 2B:
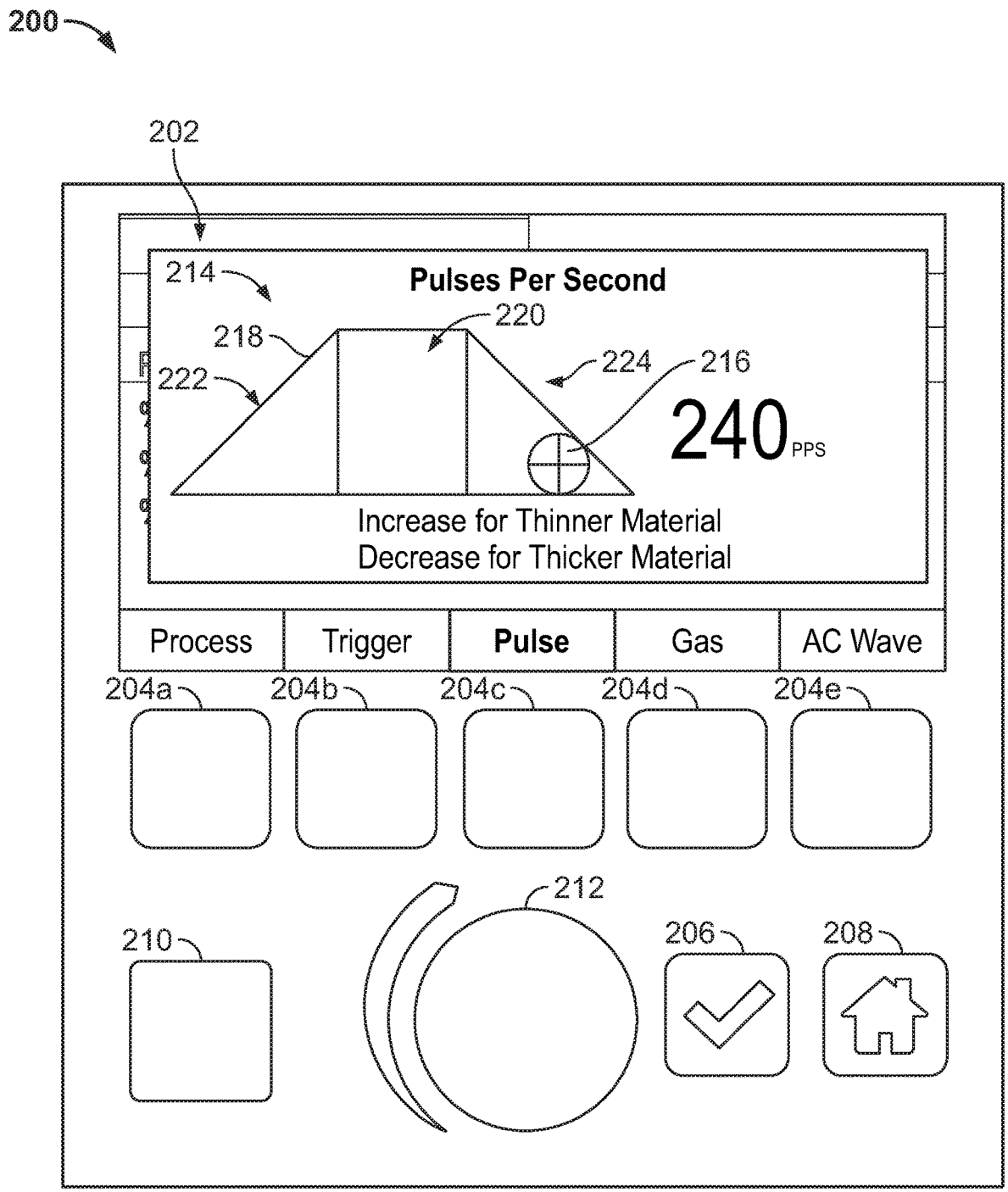
FIG. 2B illustrates the example user interface in response to a change in the frequency for a selected amperage

FIG. 2B illustrates the example user interface 200 in response to a change in the frequency for a selected amperage, such as an operator input to change the frequency via the knob 212. The example user interface 200 may similarly represent a change in the amperage for a selected frequency.

In some examples, the control circuitry 112 may update the graphic 214 representative of the frequency value and the frequency range based on changes to the amperage, or vice versa. For example, while the indicator 216 of FIG. 2B is in the right portion 224 of the graphic 214 for a given amperage, a change to the amperage will cause the control circuitry 112 to recalculate the frequency range, change the frequency ranges represented by the graphic 214 and the portions 220, 222, 224, and display the indicator 216 with respect to the graphic 214 based on the updated range.

Figure 2C:
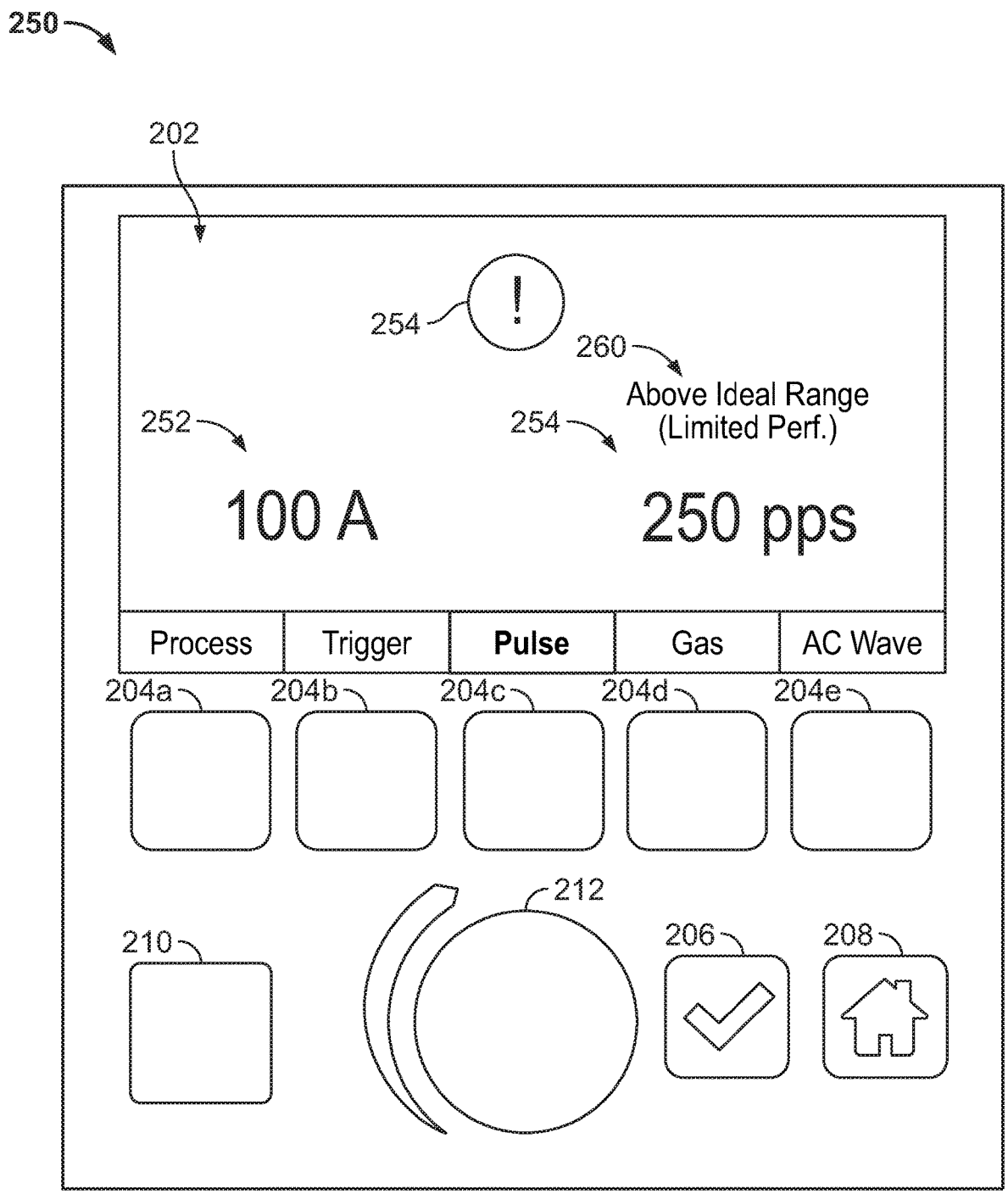
FIG. 2C is another example user interface that may implement the user interface of FIG. 1 to enable an operator to adjust one or more parameters of a welding-type output waveform, and/or to output another type of indication of a selected parameter with respect to a determined range of parameters.

FIG. 2C is another example user interface 230 that may implement the user interface 114, 134 of FIG. 1 to enable an operator to adjust one or more parameters of a welding-type output waveform, and/or to output another type of indication of a selected parameter with respect to a determined range of parameters. The example user interface 230 of FIG. 2B includes the display 202, the buttons 204a-204e, 206-210 and the knob 212 of FIG. 2A.

In the example of FIG. 2C, the display 202 presents an amperage value 232 and a frequency value 234 (e.g., pulses per second for DC pulses processes). The display 202 further presents an indication 236 of the frequency value 234 with respect to a determined range of values. In the example of FIG. 2C, the indication 236 includes an indicator graphic 238 and an text explanation 240 of the frequency value, such as "above ideal range," in which changes to the frequency above the determined frequency range may result in a limited ability of the power supply 102 to provide the specified pulse shape at the configured amperage. When the selected frequency is below the determined frequency range, the indication 236 may include a text explanation that changes to the frequency below the determined frequency range has a limited effect relative to changes to the frequency within the determined range.

Figure 2D:
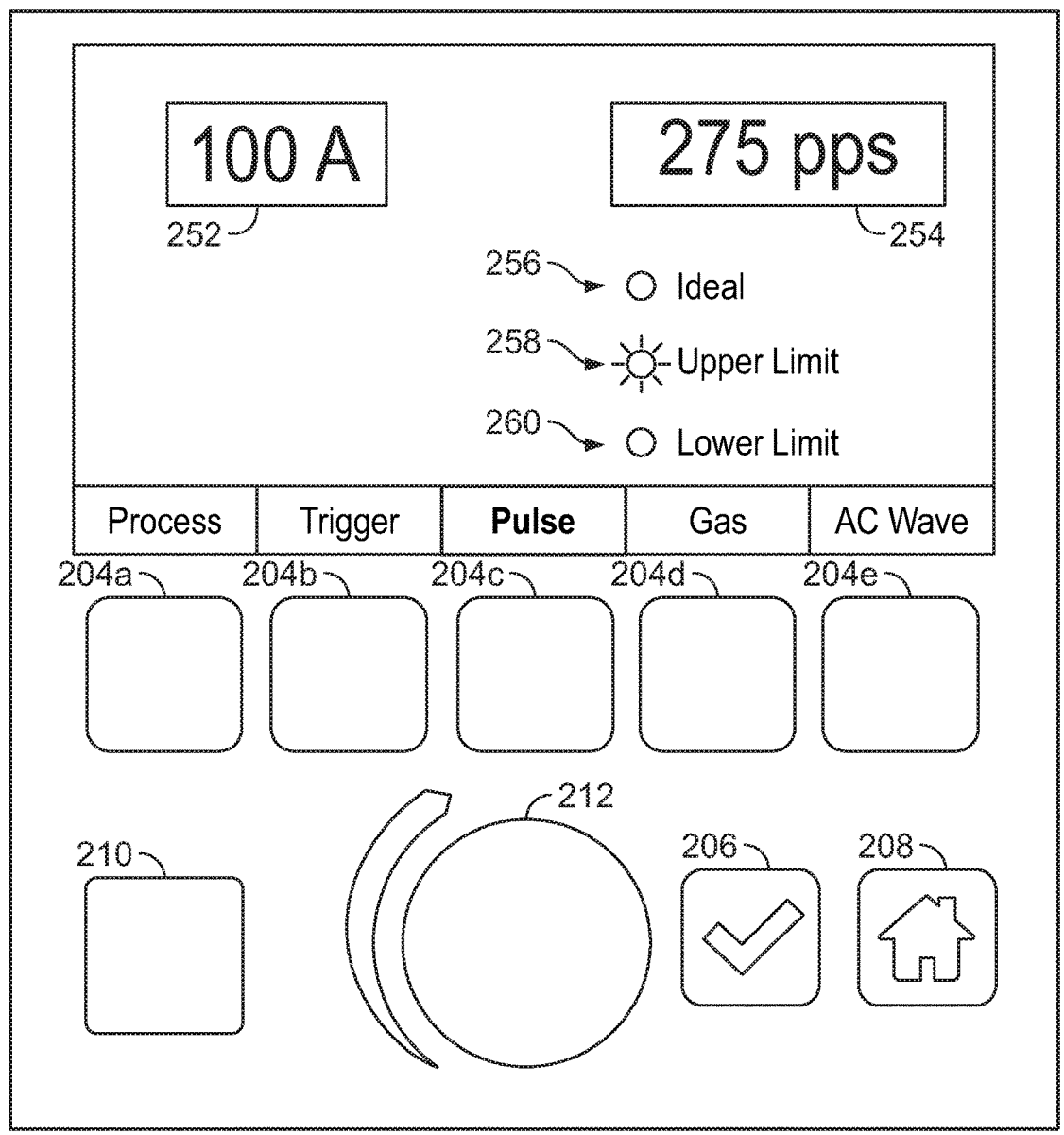
FIG. 2D is another example user interface that may implement the user interface of FIG. 1 to output an indication of a selected frequency with respect to a determined range of frequencies.

FIG. 2D is another example user interface 250 that may implement the user interface 114, 134 of FIG. 1 to output an indication of a selected frequency with respect to a determined range of frequencies. Additionally or alternatively, the user interface 250 may output an indication of a selected amperage with respect to a determined range of amperage.

The example user interface 250 includes output displays 252, 254, which output the selected amperage and the selected frequency. However, the displays 252, 254 may be configured to output a value for any parameter that is being configured by the operator, change to outputting a value and/or an identification of a selected parameter in response to selection of the parameter by the operator, and/or output values of default parameters in response to a lack of input (e.g., for a threshold time).

The example user interface 250 further includes indicators 256, 258, 260 to provide an indication to the operator of the value of the amperage or frequency with respect to a determined range of values for the parameter. The example indicator 256 is a visual indicator (e.g., a light, an LED, etc.) that is lit when the selected frequency is considered a preferred (or ideal) value determined based on the selected amperage. Additionally or alternatively, the indicator 256 may be configured to output the indication when the selected frequency is within a preferred (or ideal) range of frequencies determined by the control circuitry 112 based on the selected amperage.

The example indicator 258 is a visual indicator (e.g., a light, an LED, etc.) that is lit when the selected frequency has reached (e.g., is equal to) an upper limit on the frequency, where the upper limit is determined based on the amperage. Similarly, the example indicator 260 is a visual indicator (e.g., a light, an LED, etc.) that is lit when the selected frequency has reached (e.g., is equal to) a lower limit on the frequency, where the lower limit is determined based on the amperage. In some examples, the control circuitry 112 controls the respective indicator 258, 260 to light when the corresponding limit is reached by the operator selecting the frequency (e.g., by incrementing or decrementing the frequency via the knob 212).

The limits triggering the indicators 258, 260 may be selected to be the limits of a preferred range and/or the limits of one or more acceptable ranges. When the limits of a preferred range is used, the control circuitry 112 may treat the limits as "soft" limits that may be exceeded (e.g., the operator may be permitted to select frequency values outside of the range represented by the limits), while continuing to output the indication via the corresponding indicator 258, 260. In some examples, when the limits of an acceptable range is used, the control circuitry 112 may treat the limits as "hard" limits that may not be exceeded, and output the indication via the corresponding indicator 258, 260 while the selected frequency is equal to the corresponding lower or upper frequency limit. However, a preferred range of frequencies may be treated as "hard" limits and/or an acceptable range of frequencies may be treated as "soft" limits.

While example indicators 256, 258, 260 are illustrated in FIG. 2D, additional and/or alternative indicators may be used. For example, indicators may be included for both "hard" and "soft" limits and/or for different ranges (e.g., a preferred range vs. an acceptable range).

While FIG. 2D is described above with reference to selecting frequency and limits on the frequency based on the selected amperage, the example user interface 250 may additionally or alternatively operate the indicators 256, 258, 260 based on a selected amperage relative to an amperage range that is based on a selected frequency.

Any of the example interfaces 200, 230, 250 may provide other indications of a frequency determined based on a selected amperage, or indications of an amperage determined based on a selected frequency. For example, the control circuitry 112 may control the determined parameter (e.g., frequency, amperage) to provide a visual or other indication (e.g., flashing, color, etc.) on a display or other output device that a displayed value of the parameter (e.g., frequency, amperage) has been automatically selected based on one or more other parameters (e.g., amperage, frequency, etc.).

Figure 3A:
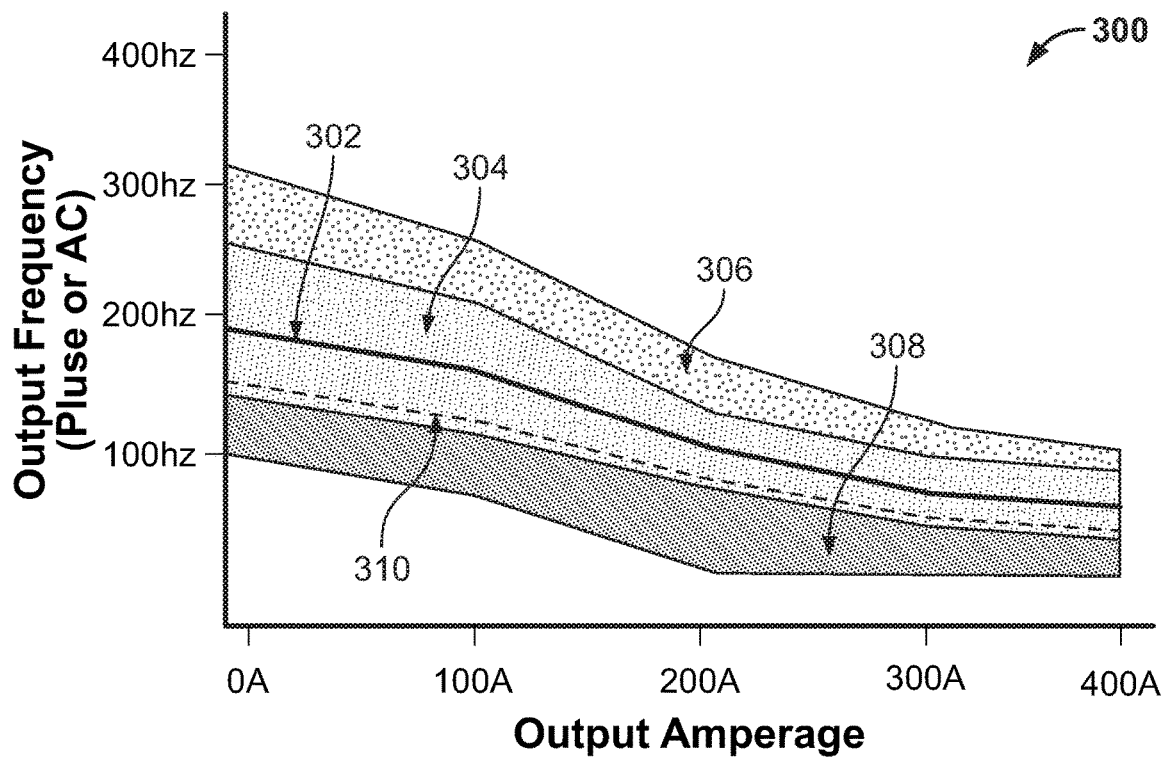
FIG. 3A is a chart representative of an example table or function that may be used by the welding-type power supply of FIG. 1 to determine a frequency parameter, a frequency range, an amperage parameter, and/or an amperage range.

FIG. 3A is a chart 300 representative of an example table or function that may be used by the welding-type power supply 102 of FIG. 1 to determine a frequency parameter, a frequency range, an amperage parameter, and/or an amperage range. The example chart 300 may be stored as one or more data structures, data points, and/or any other format in the storage devices 123 and/or memory 124 of FIG. 1.

The example chart 300 includes relationship 302, which may be stored as one or more functions and/or data points. If the control circuitry 112, 132 has enabled an automatic configuration mode, the control circuitry 112, 132 may respond to a selection of the amperage parameter by determining a corresponding frequency according to the relationship 302.

The example chart 300 further illustrates ranges 304, 306, 308 representative of combinations of amperage and frequency values. The example range 304 is representative of preferred or optimal values of frequency for each amperage value or, conversely, preferred or optimal values of amperage for each frequency. The example range 306 is representative of secondary (e.g., less preferred, sub-optimal) values of frequency for each amperage value (or vice-versa), and the example range 308 is representative of performance-limited values of frequency for each amperage value (or vice-versa).

In some examples, the control circuitry 112 enables the operator to select a modified relationship 310 as a function of the relationship 302 (e.g., via the user interface 114 and/or the input device(s) 115). For example, the control circuitry 112 may substitute a relationship 310 for the relationship 302 when automatically selecting frequency values or amperage values. The relationship 310 may be defined using, for example, a selected percentage deviation or by a fixed deviation. An example percentage deviation may include adjusting the frequency or amperage higher or lower than the value specified by the relationship 302 by a selected percentage of the frequency or amperage value. Other example percentage deviations may include adjusting the frequency or amperage higher or lower than the value specified by the relationship 302 by a selected percentage of the difference between the upper and lower limit values of the preferred range 304 (or a combination of the ranges 304, 306, and/or 308), or a selected percentage of the difference between the value specified by the relationship 302 and the upper or lower limit value of the preferred range 304. An example fixed deviation may include a set frequency or amperage difference, such as X Hz or X pulses per second higher or lower than the frequency specified by the relationship 302.

Figure 3B:
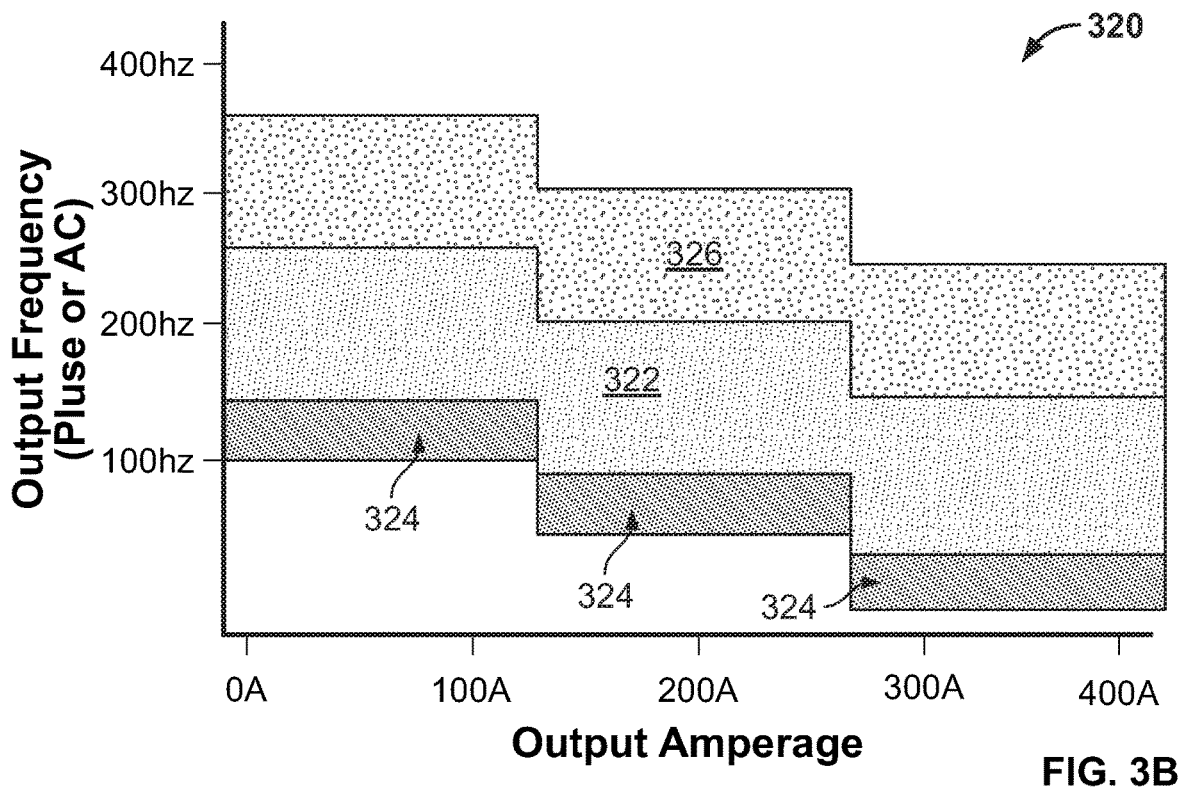
FIG. 3B is a chart representative of another example table or function that may be used by the welding-type power supply of FIG. 1 to determine a frequency parameter, a frequency range, an amperage parameter, and/or an amperage range.

FIG. 3B is a chart 320 representative of another example table or function that may be used by the welding-type power supply 102 of FIG. 1 to determine a frequency parameter, a frequency range, an amperage parameter, and/or an amperage range. The example chart 320 may be stored as one or more data structures, data points, and/or any other format in the storage devices 123 and/or memory 124 of FIG. 1.

Like the chart 300 of FIG. 3A, the example chart 320 includes a preferred range 322 representative of preferred or optimal values of frequency for each amperage value, a secondary range 324 representative of secondary values of frequency for each amperage value, and a range 326 representative of performance-limited values. In contrast with the predetermined ranges of FIG. 3A, which have upper and lower frequency limits that change with the amperage, the example ranges 322, 324, 326 have upper and lower frequency limits that change at predetermined amperage thresholds. For example, the ranges 322, 324, 326 have constant respective upper and lower frequency limits from 0 Amperes to 125 Amperes, from 125 Amperes to 266 Amperes, and from 266 Amperes to 425 Amperes. However, other amperage limits may be used.

The portions of the chart outside the ranges 322, 324, 326 may indicate combinations of frequency and amperage that are not permitted by the control circuitry 112, 132. For example, for an output current of 100 Amperes, the control circuitry 112, 132 may not increase the frequency beyond 350 Hz despite receiving inputs via the knob 212 to further increase the frequency. While the example range 324 includes lower frequency limits, in some examples the lower frequency limits of the range 324 is near 0 Hz, or the lowest frequency that the power supply 102 is capable of outputting AC or DC pulse welding power.

In some examples, if a frequency is selected (e.g., via the operator interface 114, 134) that is within a threshold difference from the upper frequency limit or lower frequency limit, the control circuitry 112, 132 outputs an notification to the operator, such as to indicate that the frequency is approaching the frequency limit. In other examples, the control circuitry 112, 132 outputs an notification to the operator when the upper frequency limit or the lower frequency limit is reached.

Figure 3C:
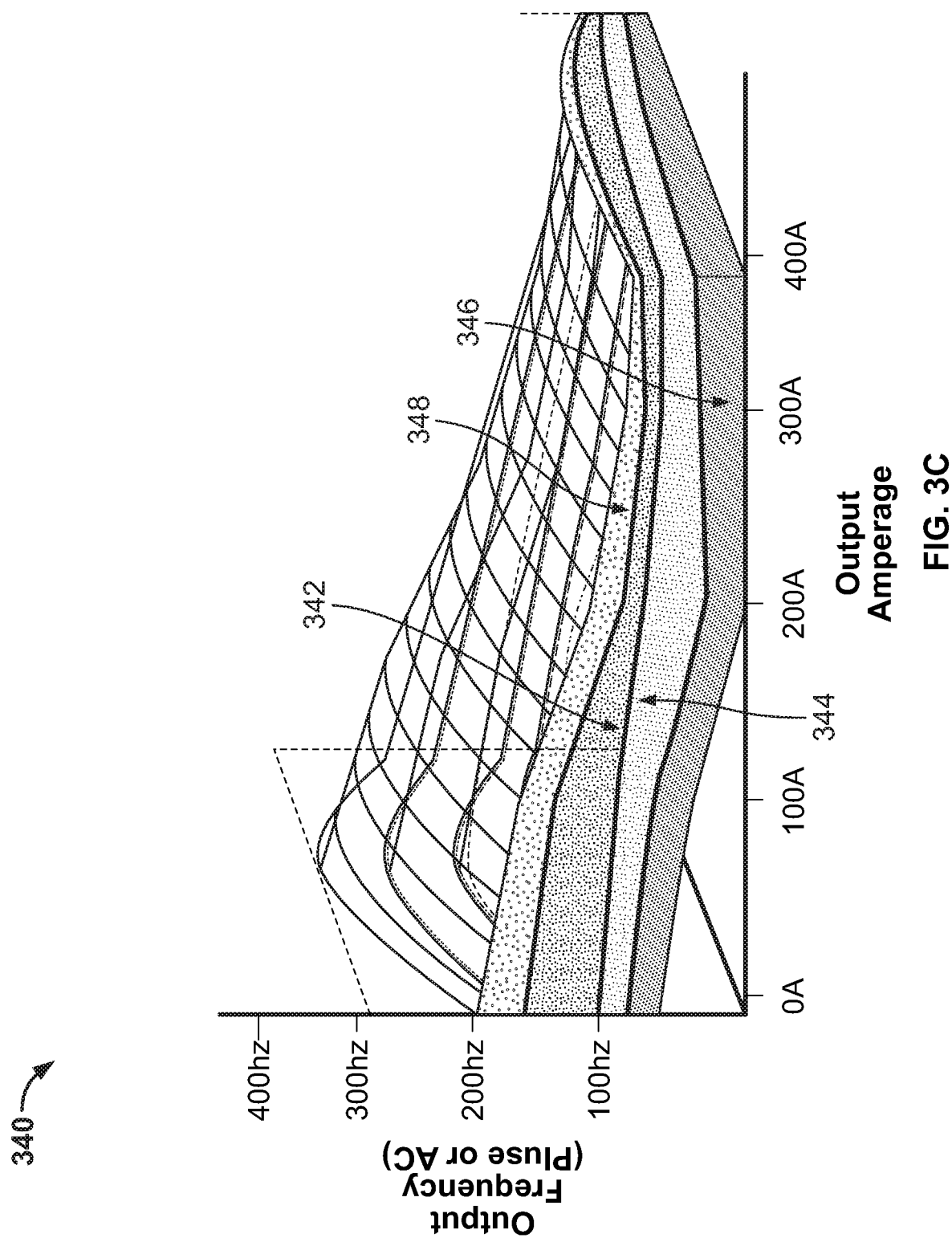
FIG. 3C is a chart representative of another, multi-dimensional table or function that may be used by the welding-type power supply of FIG. 1 to determine a frequency parameter, a frequency range, an amperage parameter, and/or an amperage range, based on one or more additional parameters.

FIG. 3C is a chart 340 representative of another, multi-dimensional table or function that may be used by the welding-type power supply 102 of FIG. 1 to determine a frequency parameter, a frequency range, an amperage parameter, and/or an amperage range, based on one or more additional parameters. The example chart 340 includes pulse peak time as a third parameter, though other parameters may be used.

Like the example chart 300 of FIG. 3A, the chart 340 includes a relationship 342 that may be used in an automatic configuration mode. The chart 340 further includes a preferred range 344 representative of preferred or optimal values of frequency for each amperage value, a secondary range 346 representative of secondary values of frequency for each amperage value, and a range 348 representative of performance-limited values.

In some examples, the preferred range includes all frequencies (or all frequencies that the power conversion circuitry is capable of outputting or configured to output) that are less than a threshold current. For example, low currents below a threshold current do not create distortion, regardless of the frequency used by the power conversion circuitry.

Figure 4:
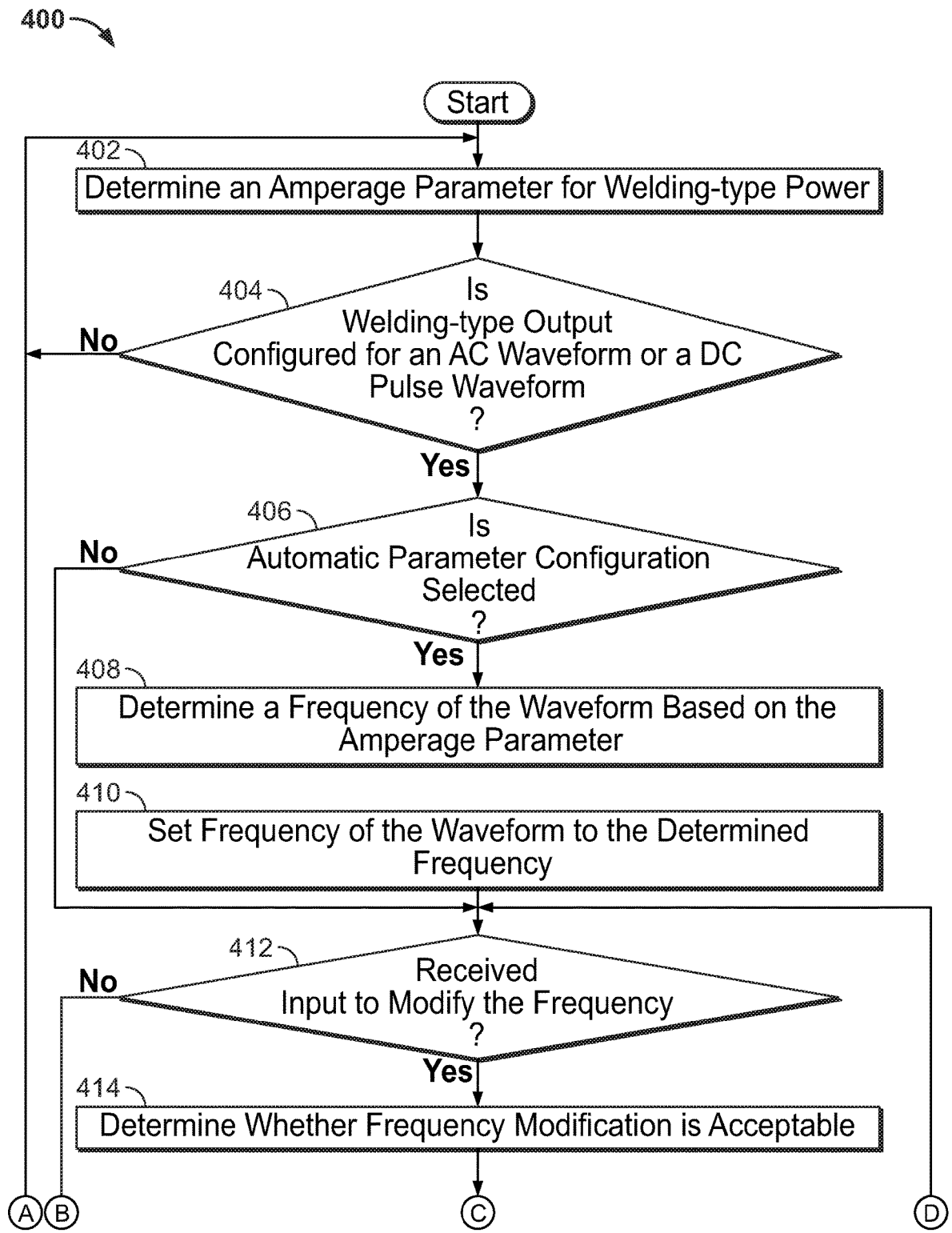
FIG. 4 is a flowchart illustrating example machine readable instructions which may be executed by the welding-type power supply of FIG. 1 to select and control a frequency of an output waveform.
Figure 4:
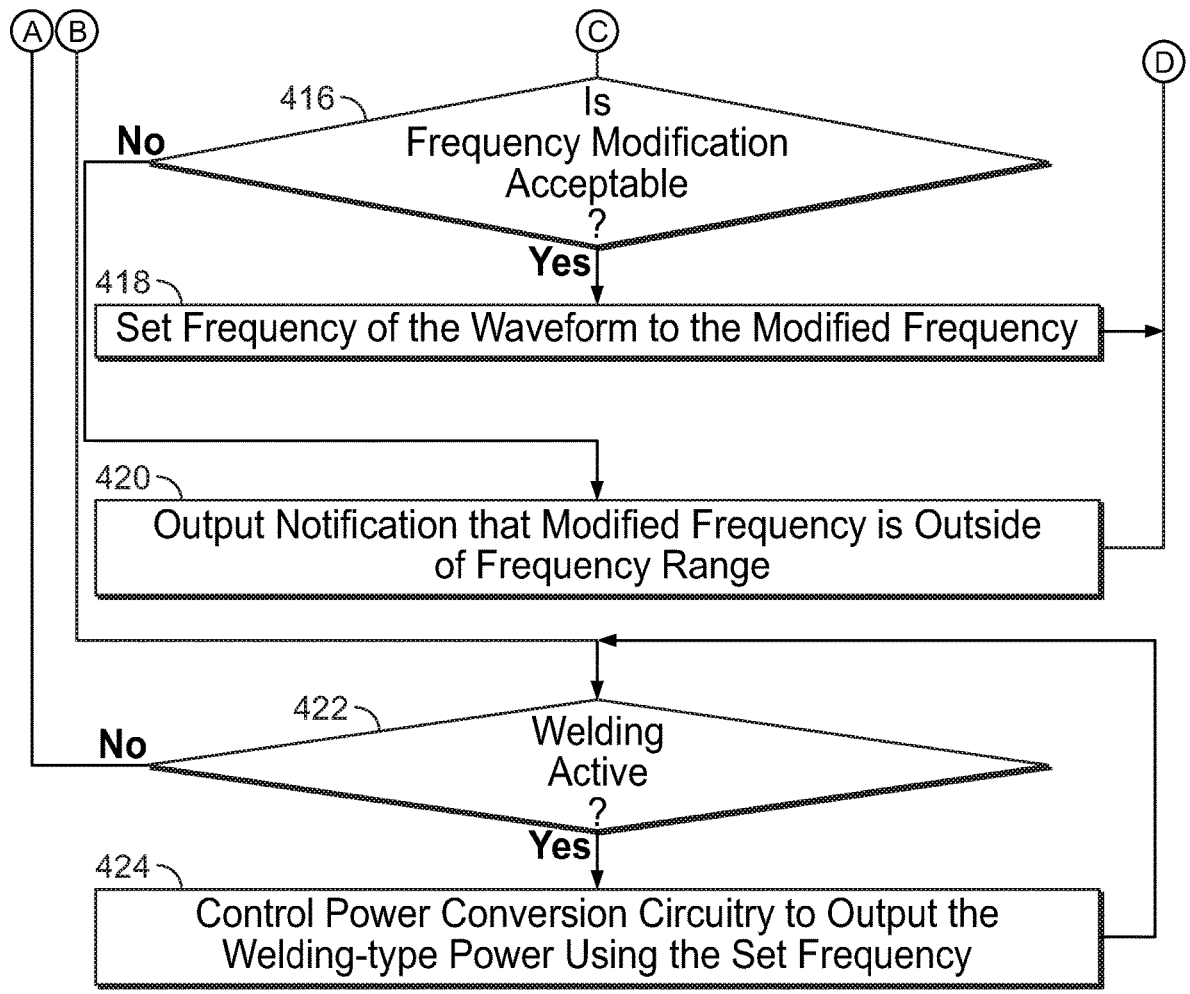

FIG. 4 is a flowchart illustrating example machine readable instructions 400 which may be executed by the welding-type power supply 102 of FIG. 1 to select and control a frequency of an output waveform. The example instructions 400 may be stored in the storage device 123 and/or the memory 124, and executed by the processor(s) 120. The instructions 400 are discussed below with reference to the power supply 102 and the user interface 200 of FIG. 2A. However, blocks 402-414 may be performed by the example remote interface 104 of FIG. 1.

At block 402, the control circuitry 112 determines an amperage parameter for welding-type power to be output by the power conversion circuitry 110. For example, the control circuitry 112 may receive a selection of an amperage parameter via the knob 212 of the user interface 200. The amperage parameter may be a current setpoint, an average current, a root-mean-square (RMS) current, a peak current, an electrode negative peak current, an electrode negative commutation current, an electrode positive peak current, or an electrode positive commutation current, and/or any other current.

At block 404, the control circuitry 112 determines whether the welding-type output is configured for an AC waveform, a DC pulse waveform, or a different welding process. For example, the control circuitry 112 may be capable of controlling the power conversion circuitry using different welding processes, including DCEN, DCEP, AC, and/or DC pulse waveforms, among others. If the welding-type output is not configured for either an AC waveform or a DC pulse waveform (block 404), control returns to block 402.

If the welding-type output is configured for either an AC waveform or a DC pulse waveform (block 404), at block 406 the control circuitry 112 determines whether automatic parameter configuration is selected (e.g., enabled). For example, the control circuitry 112 may determine whether the automatic configuration button 210 is selected on the user interface 200.

If automatic parameter configuration is selected (block 406), at block 408 the control circuitry 112 determines a frequency of the waveform based on the amperage parameter. For example, the control circuitry 112 may access a predetermined relationship, such as the relationship 302 of FIG. 3A, to determine a frequency that corresponds to the determined amperage parameter. The predetermined relationship may be fixed, or may be selected from multiple predetermined relationships based on one or more other parameter values. For example, parameter values that may be used to select a predetermined relationship may include a pulse peak current time, a pulse peak current percentage, a pulse background current time, a pulse background current percentage, an AC waveform type, or a weld circuit inductance.

In some examples, the control circuitry 112 determines an inductance of a welding-type circuit to which the power conversion circuitry 110 is coupled to output the welding-type power. For example, the control circuitry 112 may measure, calculate, and/or estimate the inductance of the weld circuit, and/or the inductance may be input by the user (e.g., via the user interface 114, 134). The control circuitry 112 may then be used to select an appropriate predetermined relationship (e.g., a three-dimensional lookup table or function, similar to the chart 340 of FIG. 3C) to determine the frequency based on the amperage parameter and the determined inductance.

Additionally or alternatively, the control circuitry 112 may identify (e.g., via a current sensor) when the current does not reach the peak current level or the background current level during a DC pulse process, which indicates that the inductance is too high for the selected amperage and frequency. In such examples, the control circuitry 112 may output a warning or alert that the current is not reaching to the intended level, or does not reach the intended level within the expected time, due to detected high inductance and/or detected wave shape variations. Additionally or alternatively, the control circuitry 112 may automatically adjust the frequency in response to detecting that the expected wave shape is not obtained for a threshold number of pulses or cycles.

At block 410, the control circuitry 112 sets the frequency of the waveform to the determined frequency.

After setting the frequency (block 410), or if automatic parameter configuration is not selected (block 406), at block 412 the control circuitry 112 determines whether an input has been received to modify the frequency. For example, the control circuitry 112 may permit changes to an automatically configured frequency, or the frequency may not be automatically configured. An example input to modify the frequency may be received via the input devices 115, 135, such as the knob 212 of FIGS. 2A and/or 2B.

If an input to modify the frequency has been received (block 412), at block 414 the control circuitry 112 determines whether a frequency modification is acceptable. For example, the control circuitry 112 may compare the selected frequency to one or more ranges of frequencies based on the amperage parameter, to determine whether the combination of amperage and frequency will lead to an acceptable weld condition. An example method to determine whether a frequency modification is acceptable is disclosed below with reference to FIG. 5.

If the frequency modification is acceptable (block 416), at block 418 the control circuitry 112 sets the frequency of the waveform to the modified frequency. In some examples, the control circuitry 112 may output an indication of the modified frequency with respect to the range and/or with respect to a value that would be automatically configured (e.g., a preferred or optimal value), such as via the graphic 214 of FIG. 2A. Conversely, if the frequency modification is not acceptable (block 416), the control circuitry 112 outputs a notification that the modified frequency is outside of the frequency range. For example, the control circuitry 112 may output an indication such as the example indication illustrated in FIG. 2B. After setting the frequency (block 418) or outputting the notification (block 420), control returns to block 412.

If an input to modify the frequency is not received (e.g., the user confirms that the frequency is acceptable) (block 412), at block 420 the control circuitry 112 determines whether welding is active. For example, the control circuitry 112 may determine whether welding current is flowing or if there is an output voltage corresponding to an arc. If welding is active (block 422), at block 424 the control circuitry 112 controls the power conversion circuitry 110 to output the welding-type power using the set frequency. The set frequency may be, for example, the automatically set frequency (block 410) or the modified frequency (block 418). Control iterates to block 422 to continue welding. If welding is not active (block 422), control returns to block 402.

Figure 5:
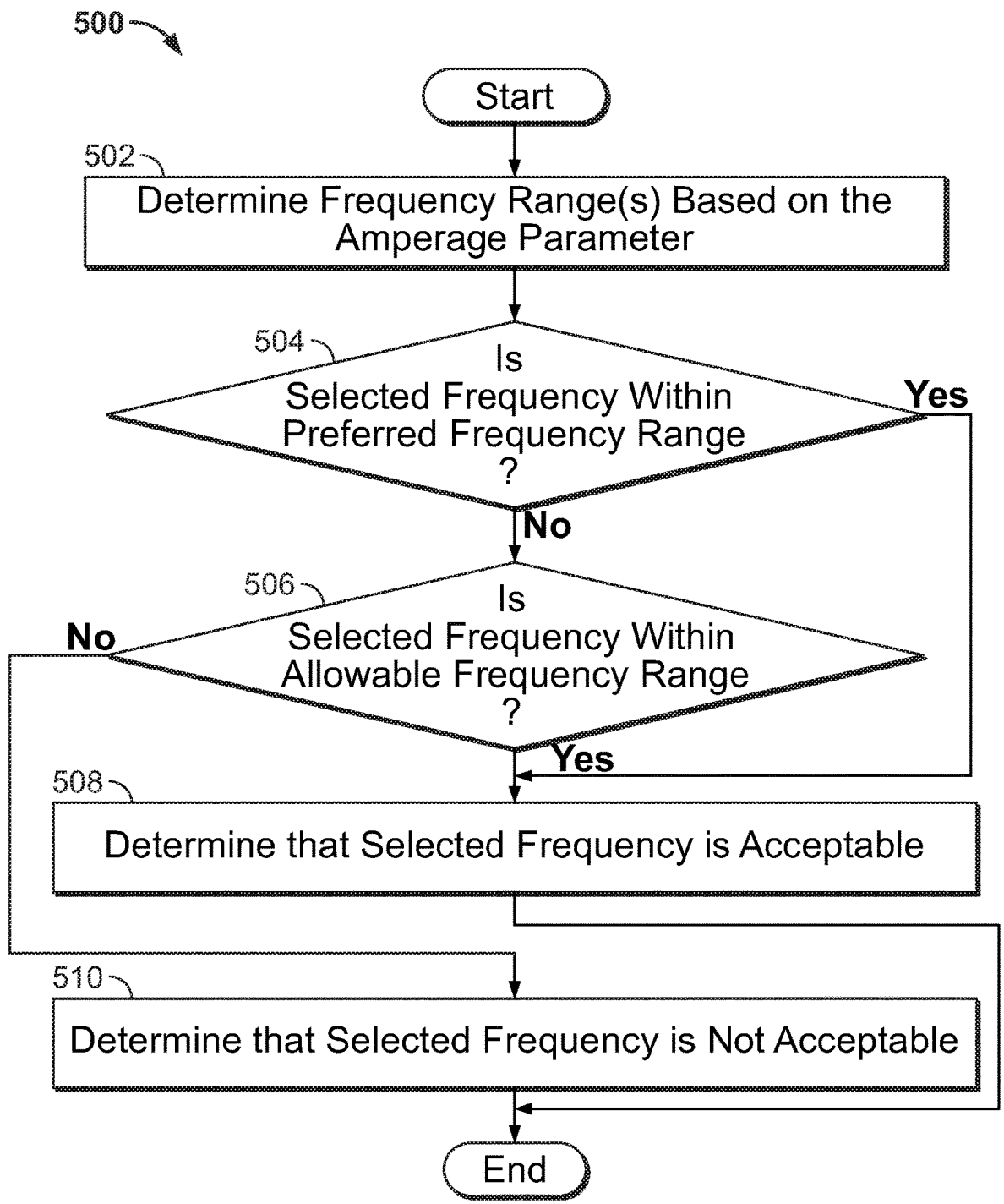
FIG. 5 is a flowchart illustrating example machine readable instructions which may be executed by the welding-type power supply of FIG. 1 to determine whether a frequency modification is acceptable based on one or more predetermined relationships.

FIG. 5 is a flowchart illustrating example machine readable instructions 500 which may be executed by the welding-type power supply 102 of FIG. 1 to determine whether a frequency modification is acceptable based on one or more predetermined relationships. The example instructions 500 may be executed by the control circuitry 112, 132 of FIG. 1 to implement block 414 of FIG. 4. The example instructions 500 may enter from block 412 of FIG. 4.

At block 502, the control circuitry 112 determines one or more frequency ranges based on the determined amperage parameter. For example, the control circuitry 112 may look up a predetermined relationship stored in the tables 126. Example ranges are illustrated in FIGS. 3A, 3B, and 3C. At block 504, the control circuitry 112 determines whether the selected frequency (e.g., selected at block 412 of FIG. 4) is within a preferred frequency range. For example, the control circuitry 112 may determine whether the selected frequency is in a respective preferred frequency range 304, 322, or 344 of FIG. 3A, 3B, or 3C, based on the selected predetermined relationship, or any other range that is stored as a preferred or optimal range.

If the selected frequency is not within a preferred frequency range (block 504), at block 506 the control circuitry 112 determines whether the selected frequency is within an allowable frequency range. For example, the control circuitry 112 may determine whether the selected frequency is in a respective acceptable or limited frequency range 306, 308, 324, 326, 346, or 348 of FIG. 3A, 3B, or 3C, based on the selected predetermined relationship, or any other range that is stored as a permissible or acceptable range for the power conversion circuitry 110 to implement.

If the selected frequency is within a preferred frequency range (block 504), or the selected frequency is within an allowable frequency range (block 506), at block 508 the control circuitry 112 determines that the selected frequency is acceptable, or that the operator will be permitted to perform a welding operation using the selected frequency and amperage.

Conversely, if the selected frequency is not within either of a preferred frequency range (block 504) or an allowable frequency range (block 506), at block 510 the control circuitry 112 determines that the selected frequency is not acceptable, or that the operator will not be permitted to perform a welding operation using the selected frequency and amperage.

After determining that the selected frequency is acceptable (block 508) or not acceptable (block 510), the example instructions 500 end and return control to block 416 of FIG. 4.

Figure 6:
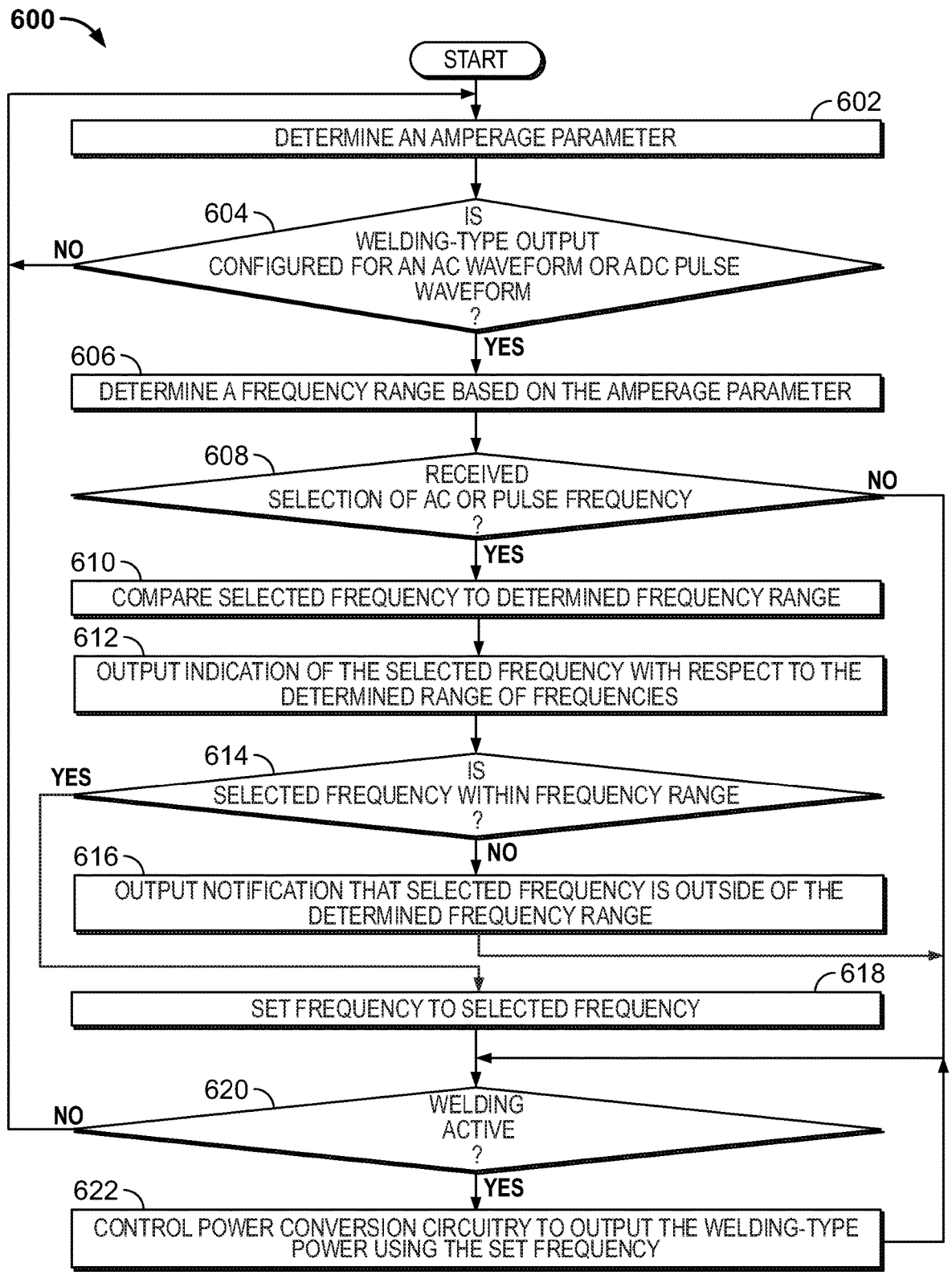
FIG. 6 is a flowchart illustrating example machine readable instructions which may be executed by the welding-type power supply of FIG. 1 to control an interface to output an indication of a selected frequency with respect to a determined range, based on one or more predetermined relationships.

FIG. 6 is a flowchart illustrating example machine readable instructions 600 which may be executed by the welding-type power supply 102 of FIG. 1 to control an interface to output an indication of a selected frequency with respect to a determined range, based on one or more predetermined relationships. The example instructions 600 may be stored in the storage device 123 and/or the memory 124, and executed by the processor(s) 120. The instructions 600 are discussed below with reference to the power supply 102 and the user interface 200 of FIG. 2A. However, blocks 602-616 may be performed by the example remote interface 104 of FIG. 1.

At block 602, the control circuitry 112 determines an amperage parameter for welding-type power to be output by the power conversion circuitry 110. For example, the control circuitry 112 may receive a selection of an amperage parameter via the knob 212 of the user interface 200. The amperage parameter may be a current setpoint, an average current, a root-mean-square (RMS) current, a peak current, an electrode negative peak current, an electrode negative commutation current, an electrode positive peak current, or an electrode positive commutation current, and/or any other current.

At block 604, the control circuitry 112 determines whether the welding-type output is configured for an AC waveform, a DC pulse waveform, or a different welding process. For example, the control circuitry 112 may be capable of controlling the power conversion circuitry using different welding processes, including DCEN, DCEP, AC, and/or DC pulse waveforms, among others. If the welding-type output is not configured for either an AC waveform or a DC pulse waveform (block 604), control returns to block 602.

If the welding-type output is configured for either an AC waveform or a DC pulse waveform (block 604), at block 606 the control circuitry 112 determines a frequency range based on the amperage parameter. For example, the control circuitry 112 may determine a frequency range based on a predetermined relationship corresponding to one or more weld parameters, such as a pulse peak current time, a pulse peak current percentage, a pulse background current time, a pulse background current percentage, an AC waveform type, or a weld circuit inductance. The determined frequency range may be selected from one or more sub-ranges, such as preferred ranges, acceptable ranges, and/or limited performance ranges, such as the ranges 304-308, 322-326, and 344-348 of FIGS. 3A, 3B, and 3C. In some examples, the determined frequency range is limited to the preferred range specified in the tables 126. In other examples, the determined frequency range may include an acceptable range, or an acceptable range and a limited performance range.

At block 608, the control circuitry 112 determines whether a selection of an AC or pulse frequency has been received. An example input to select the frequency may be received via the input devices 115, 135, such as the knob 212 of FIGS. 2A and/or 2B. If a frequency selection has been received (block 608), at block 610 the control circuitry 112 compares the selected frequency to the determined frequency range.

At block 612, the control circuitry 112 outputs an indication of the selected frequency with respect to the determined range of frequencies. For example, the control circuitry 112 may output the graphic 214 of FIG. 2A, the indicator graphic 258 and/or the text explanation 260 of FIG. 2B, a visual alert, alarm, display, or graphic, an audible alert, alarm, or message, a communications notification (e.g., a phone alert, email, text message, etc.) and/or any other indication (e.g., message, alert, alarm, notification, etc.) that represents the value of the selected frequency with reference to the determined range of frequencies.

At block 614, the control circuitry 112 determines whether the selected frequency is within the determined frequency range. If the selected frequency is not within the determined frequency range (block 614), at block 616 the control circuitry 112 outputs a notification (e.g., via the user interface 114) that the selected frequency is outside of the determined frequency range. The notification may be in addition to or implemented into the indication of block 612. Conversely, if the selected frequency is within the determined frequency range (block 614), at block 618 the control circuitry 112 sets the frequency of the output waveform to the selected frequency.

If a frequency selection has not been made (block 608), after outputting the notification (block 616), or after setting the frequency (block 618), at block 620 the control circuitry 112 determines whether welding is active. For example, the control circuitry 112 may determine whether welding current is flowing or if there is an output voltage corresponding to an arc. If welding is active (block 620), at block 622 the control circuitry 112 controls the power conversion circuitry 110 to output the welding-type power using the set frequency. Control iterates to block 620 to continue welding. If welding is not active (block 620), control returns to block 602.

Figure 7:
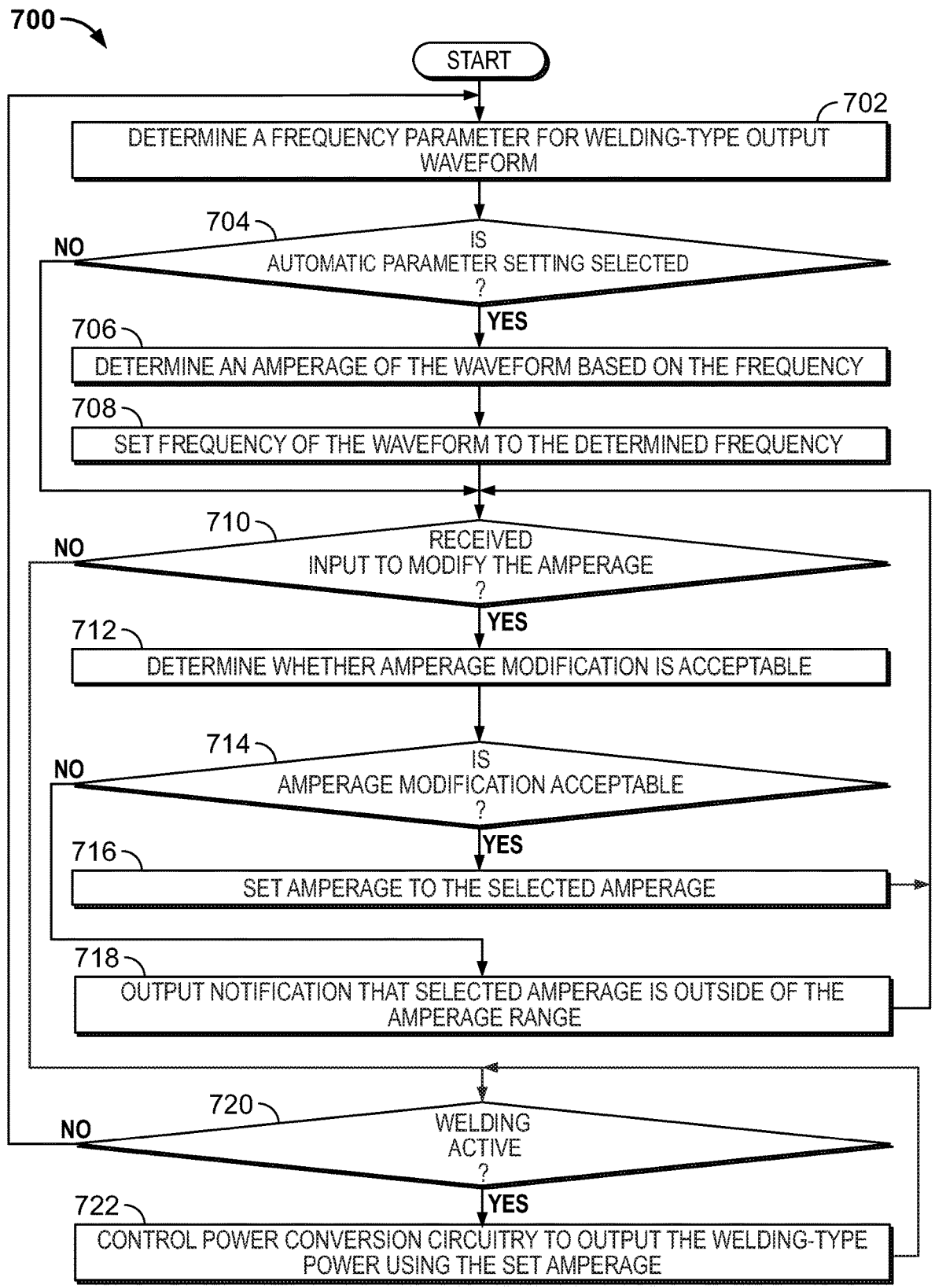
FIG. 7 is a flowchart illustrating example machine readable instructions which may be executed by the welding-type power supply of FIG. 1 to select and control an amperage parameter of an output waveform.

FIG. 7 is a flowchart illustrating example machine readable instructions 700 which may be executed by the welding-type power supply 102 of FIG. 1 to select and control an amperage parameter of an output waveform. The example instructions 700 may be stored in the storage device 123 and/or the memory 124, and executed by the processor(s) 120. The instructions 700 are discussed below with reference to the power supply 102 and the user interface 200 of FIG. 2A. However, blocks 702-718 may be performed by the example remote interface 104 of FIG. 1.

At block 702, the control circuitry 112 determines a frequency parameter for welding-type power to be output by the power conversion circuitry 110. For example, the control circuitry 112 may receive a selection of a frequency parameter via the knob 212 of the user interface 200. The frequency parameter may be number of pulses per second (e.g., for DC pulse operations) or a number of cycles per second (e.g., for AC operations).

At block 704 the control circuitry 112 determines whether automatic parameter configuration is selected (e.g., enabled). For example, the control circuitry 112 may determine whether the automatic configuration button 210 is selected on the user interface 200.

If automatic parameter configuration is selected (block 704), at block 706 the control circuitry 112 determines an amperage of the waveform based on the determined frequency. For example, the control circuitry 112 may access a predetermined relationship, such as the relationship 302 of FIG. 3A, to determine an amperage that corresponds to the determined frequency. The predetermined relationship may be fixed, or may be selected from multiple predetermined relationships based on one or more other parameter values. For example, parameter values that may be used to select a predetermined relationship may include a pulse peak current time, a pulse peak current percentage, a pulse background current time, a pulse background current percentage, an AC waveform type, or a weld circuit inductance. At block 708, the control circuitry 112 sets the amperage parameter for the welding operation to the determined amperage.

After setting the frequency (block 708), or if automatic parameter configuration is not selected (block 704), at block 710 the control circuitry 112 determines whether an input has been received to modify the amperage. For example, the control circuitry 112 may permit changes to an automatically configured amperage, or the amperage may not be automatically configured. An example input to modify the amperage may be received via the input devices 115, 135, such as the knob 212 of FIGS. 2A and/or 2B.

If an input to modify the amperage has been received (block 710), at block 712 the control circuitry 112 determines whether an amperage modification is acceptable. For example, the control circuitry 112 may compare the selected amperage to one or more ranges of amperages based on the frequency, to determine whether the combination of amperage and frequency will lead to an acceptable weld condition. An example method to determine whether an amperage modification is acceptable is disclosed below with reference to FIG. 5.

If the amperage modification is not acceptable (block 714), at block 716 the control circuitry 112 sets the amperage of the waveform to the modified amperage. In some examples, the control circuitry 112 may output an indication of the modified amperage with respect to the range and/or with respect to a value that would be automatically configured (e.g., a preferred or optimal value), such as via the graphic 214 of FIG. 2A. Conversely, if the amperage modification is not acceptable (block 714), the control circuitry 112 outputs a notification that the modified amperage is outside of the amperage range. For example, the control circuitry 112 may output an indication such as the example indication illustrated in FIG. 2B. After setting the amperage (block 716) or outputting the notification (block 718), control returns to block 710.

If an input to modify the amperage is not received (e.g., the user confirms that the amperage is acceptable) (block 710), at block 720 the control circuitry 112 determines whether welding is active. For example, the control circuitry 112 may determine whether welding current is flowing or if there is an output voltage corresponding to an arc. If welding is active (block 422), at block 424 the control circuitry 112 controls the power conversion circuitry 110 to output the welding-type power using the set amperage. The set amperage may be, for example, the automatically set amperage (block 708) or the modified frequency (block 716). Control iterates to block 720 to continue welding. If welding is not active (block 720), control returns to block 702.

Figure 8:
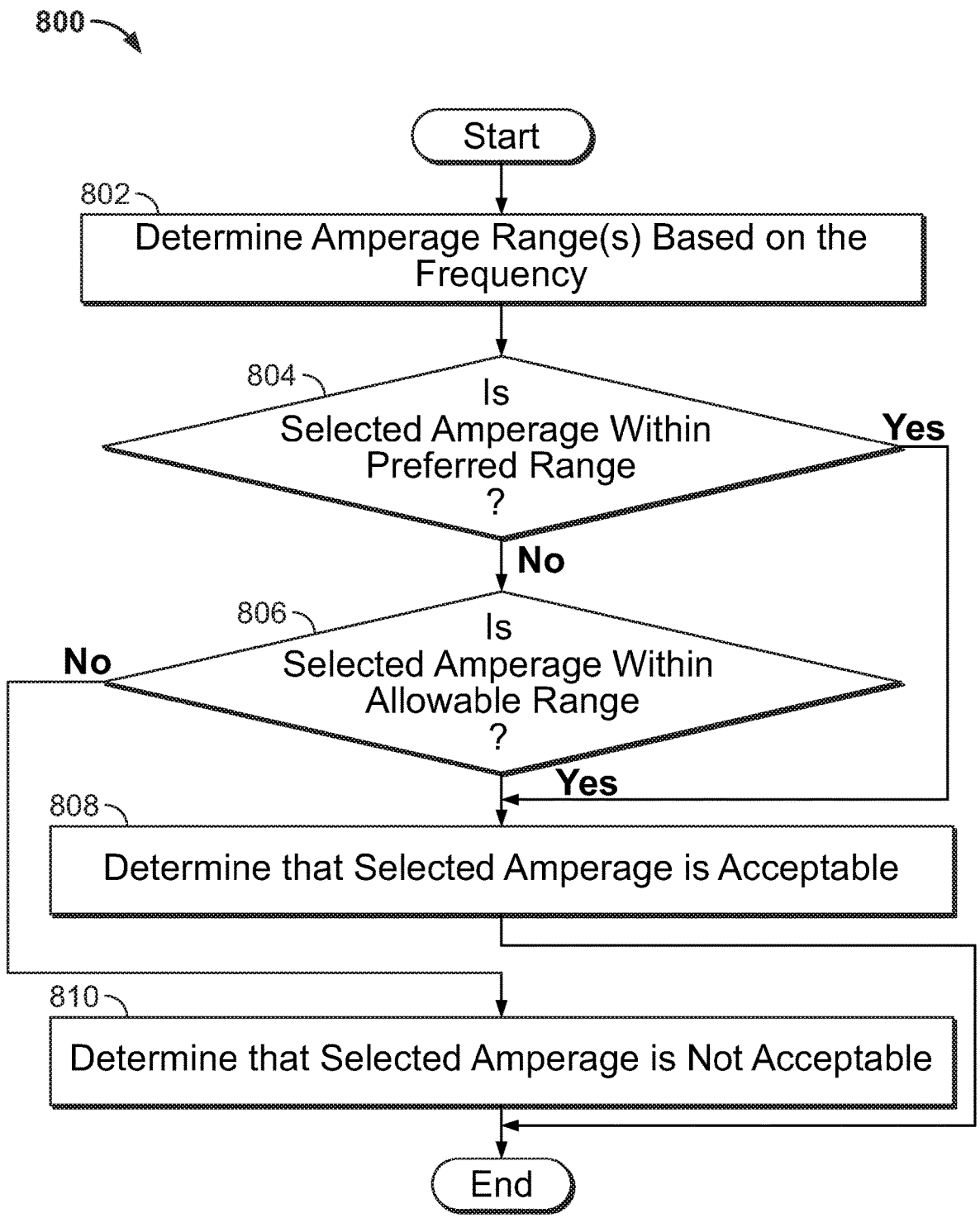
FIG. 8 is a flowchart illustrating example machine readable instructions which may be executed by the welding-type power supply of FIG. 1 to determine whether an amperage modification is acceptable based on one or more predetermined relationships.

FIG. 8 is a flowchart illustrating example machine readable instructions 800 which may be executed by the welding-type power supply 102 of FIG. 1 to determine whether an amperage modification is acceptable based on one or more predetermined relationships. The example instructions 800 may be executed by the control circuitry 112, 132 of FIG. 1 to implement block 712 of FIG. 7. The example instructions 800 may enter from block 710 of FIG. 7.

At block 802, the control circuitry 112 determines one or more amperage ranges based on the determined frequency. For example, the control circuitry 112 may look up a predetermined relationship stored in the tables 126. Example ranges are illustrated in FIGS. 3A, 3B, and 3C. At block 804, the control circuitry 112 determines whether the selected amperage (e.g., selected at block 412 of FIG. 4) is within a preferred amperage range. For example, the control circuitry 112 may determine whether the selected amperage is in a respective preferred range 304, 322, or 344 of FIG. 3A, 3B, or 3C, based on the selected predetermined relationship, or any other range that is stored as a preferred or optimal range.

If the selected amperage is not within a preferred range (block 804), at block 806 the control circuitry 112 determines whether the selected amperage is within an allowable amperage range. For example, the control circuitry 112 may determine whether the selected amperage is in a respective acceptable or limited range 306, 308, 324, 326, 346, or 348 of FIG. 3A, 3B, or 3C, based on the selected predetermined relationship, or any other range that is stored as a permissible or acceptable range for the power conversion circuitry 110 to implement.

If the selected amperage is within a preferred amperage range (block 804), or the selected frequency is within an allowable frequency range (block 806), at block 808 the control circuitry 112 determines that the selected frequency is acceptable, or that the operator will be permitted to perform a welding operation using the selected frequency and amperage.

Conversely, if the selected frequency is not within either of a preferred frequency range (block 804) or an allowable frequency range (block 806), at block 810 the control circuitry 112 determines that the selected frequency is not acceptable, or that the operator will not be permitted to perform a welding operation using the selected frequency and amperage.

After determining that the selected frequency is acceptable (block 808) or not acceptable (block 810), the example instructions 800 end and return control to block 714 of FIG. 4.

Figure 9:
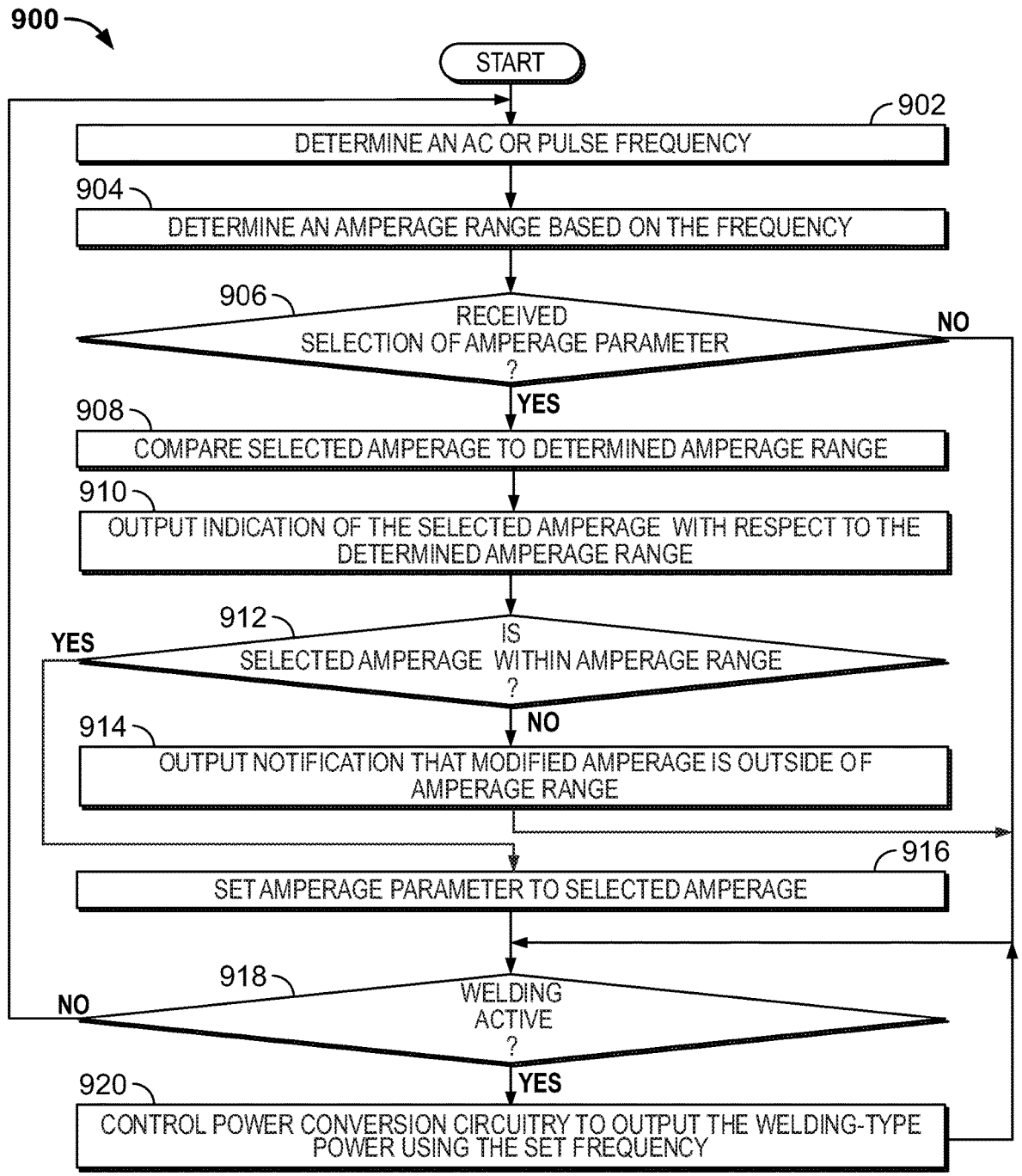
FIG. 9 is a flowchart illustrating example machine readable instructions which may be executed by the welding-type power supply of FIG. 1 to control an interface to output an indication of a selected amperage with respect to a determined range, based on one or more predetermined relationships.

FIG. 9 is a flowchart illustrating example machine readable instructions 900 which may be executed by the welding-type power supply 102 of FIG. 1 to control an interface to output an indication of a selected amperage with respect to a determined range, based on one or more predetermined relationships. The example instructions 900 may be stored in the storage device 123 and/or the memory 124, and executed by the processor(s) 120. The instructions 900 are discussed below with reference to the power supply 102 and the user interface 200 of FIG. 2A. However, blocks 902-916 may be performed by the example remote interface 104 of FIG. 1.

At block 902, the control circuitry 112 determines an AC or DC pulse frequency parameter for welding-type power to be output by the power conversion circuitry 110. For example, the control circuitry 112 may receive a selection of a frequency via the knob 212 of the user interface 200. The frequency parameter may be number of pulses per second (e.g., for DC pulse operations) or a number of cycles per second (e.g., for AC operations).

At block 904, the control circuitry 112 determines an amperage range based on the frequency. For example, the control circuitry 112 may determine an amperage range based on a predetermined relationship corresponding to one or more weld parameters, such as a pulse peak current time, a pulse peak current percentage, a pulse background current time, a pulse background current percentage, an AC waveform type, or a weld circuit inductance. The amperage parameter may be a current setpoint, an average current, a root-mean-square (RMS) current, a peak current, an electrode negative peak current, an electrode negative commutation current, an electrode positive peak current, or an electrode positive commutation current, and/or any other current.

The determined amperage range may be selected from one or more sub-ranges, such as preferred ranges, acceptable ranges, and/or limited performance ranges, such as the ranges 304-308, 322-326, and 344-348 of FIGS. 3A, 3B, and 3C. In some examples, the determined amperage range is limited to the preferred range specified in the tables 126. In other examples, the determined amperage range may include an acceptable range, or an acceptable range and a limited performance range.

At block 906, the control circuitry 112 determines whether a selection of an amperage has been received. An example input to select the amperage may be received via the input devices 115, 135, such as the knob 212 of FIGS. 2A and/or 2B. If an amperage selection has been received (block 906), at block 908 the control circuitry 112 compares the selected amperage to the determined amperage range.

At block 910, the control circuitry 112 outputs an indication of the selected amperage with respect to the determined amperage range. For example, the control circuitry 112 may output the graphic 214 of FIG. 2A, the indicator graphic 258 and/or the text explanation 260 of FIG. 2B, and/or any other indication (e.g., message, alert, alarm, notification, etc.) that represents the value of the selected amperage with reference to the determined amperage range.

At block 912, the control circuitry 112 determines whether the selected amperage is within the determined amperage range. If the selected amperage is not within the determined amperage range (block 912), at block 914 the control circuitry 112 outputs a notification (e.g., via the user interface 114) that the selected amperage is outside of the determined amperage range. The notification may be in addition to or implemented into the indication of block 910. Conversely, if the selected amperage is within the determined amperage range (block 912), at block 916 the control circuitry 112 sets the amperage of the output waveform to the selected amperage.

If an amperage selection has not been made (block 906), after outputting the notification (block 914), or after setting the amperage (block 916), at block 918 the control circuitry 112 determines whether welding is active. For example, the control circuitry 112 may determine whether welding current is flowing or if there is an output voltage corresponding to an arc. If welding is active (block 918), at block 920 the control circuitry 112 controls the power conversion circuitry 110 to output the welding-type power using the set amperage. Control iterates to block 918 to continue welding. If welding is not active (block 918), control returns to block 902.

The present methods and systems may be realized in hardware, software, and/or a combination of hardware and software A typical combination of hardware and software may include one or more application specific integrated circuits and/or chips. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
power conversion circuitry configured to convert input power to welding-type power having at least one of an alternating current (AC) waveform or a pulse waveform;
an interface configured to receive an input representative of a selected frequency of the AC waveform or the pulse waveform; and
control circuitry configured to:
determine a value of an amperage parameter of the welding-type power;
based on the value of the amperage parameter, determine a range of frequencies of the AC waveform or the pulse waveform;
control the interface to output a representation of the selected frequency with respect to representations of an upper frequency limit and a lower frequency limit of the determined range of frequencies;
in response to a change in the selected frequency, control the interface to update the representation of the selected frequency with respect to the representations of the upper frequency limit and the lower frequency limit of the range of frequencies; and
control the power conversion circuitry to output the welding-type power at the selected frequency and based on the amperage parameter.

2. The welding-type power supply as defined in claim 1, wherein each cycle of the AC waveform comprises an electrode negative portion and an electrode positive portion.

3. The welding-type power supply as defined in claim 2, wherein the amperage parameter comprises at least one of an average current, a root-mean-square (RMS) current, a peak current, an electrode negative peak current, an electrode negative commutation current, an electrode positive peak current, or an electrode positive commutation current.

4. The welding-type power supply as defined in claim 1, wherein the interface is configured to receive the value of the amperage parameter.

5. The welding-type power supply as defined in claim 4, wherein the control circuitry is configured to limit the selection of the frequency via the operator interface, based on at least one of the upper frequency limit or the lower frequency limit.

6. The welding-type power supply as defined in claim 5, further comprising an output device configured to output a notification in response to determining that a difference between the selected frequency and a frequency limit is less than a threshold difference.

7. The welding-type power supply as defined in claim 1, wherein the control circuitry is configured to determine an inductance of a welding-type circuit to which the power conversion circuitry is coupled to output the welding-type power, wherein the control circuitry is configured to determine the frequency based on the value of the amperage parameter and the determined inductance.

8. The welding-type power supply as defined in claim 1, wherein the control circuitry is configured to determine at least one of a pulse peak current time, a pulse peak current percentage, a pulse background current time, a pulse background current percentage, an AC waveform type, or a weld circuit inductance, wherein the control circuitry is configured to determine the frequency based on the value of the amperage parameter and at least one of the pulse peak current time, the pulse peak current percentage, the pulse background current time, the pulse background current percentage, the AC waveform type, or the weld circuit inductance.

9. The welding-type power supply as defined in claim 1, wherein each cycle of the pulse waveform comprises a peak current and a background current.

10. The welding-type power supply as defined in claim 1, wherein the control circuitry is configured to determine the range of frequencies of the AC waveform or the pulse waveform based on a selected one of a plurality of predetermined relationships between the frequency and the value of the amperage parameter.

11. A welding-type power supply, comprising:
power conversion circuitry configured to convert input power to welding-type power having at least one of an alternating current (AC) waveform or a pulse waveform;
an interface configured to receive an input representative of a selected amperage; and
control circuitry configured to:
determine a frequency of the AC waveform or the pulse waveform;
based on the frequency of the AC waveform or the pulse waveform, determine an amperage range;
control the interface to output a representation of the selected amperage with respect to representations of an upper amperage limit and a lower amperage limit of the determined amperage range;
in response to a change in the selected frequency, control the interface to update the representation of the selected amperage with respect to the representations of the upper amperage limit and the lower amperage limit of the determined amperage range; and
control the power conversion circuitry to output the welding-type power at the selected amperage and based on the frequency.

12. The welding-type power supply as defined in claim 11, wherein each cycle of the AC waveform comprises an electrode negative portion and an electrode positive portion.

13. The welding-type power supply as defined in claim 12, wherein the selected amperage comprises at least one of an average current, a root-mean-square (RMS) current, a peak current, an electrode negative peak current, an electrode negative commutation current, an electrode positive peak current, or an electrode positive commutation current.

14. The welding-type power supply as defined in claim 11, wherein the interface is configured to receive a selection of the frequency.

15. The welding-type power supply as defined in claim 14, wherein the control circuitry is configured to limit the selection of the amperage via the operator interface, based on at least one of the upper amperage limit or the lower amperage limit.

16. The welding-type power supply as defined in claim 15, further comprising an output device configured to output a notification in response to determining that a difference between the selected amperage and an amperage limit is less than a threshold difference.

17. The welding-type power supply as defined in claim 11, wherein the control circuitry is configured to determine an inductance of a welding-type circuit to which the power conversion circuitry is coupled to output the welding-type power, wherein the control circuitry is configured to determine the amperage based on the frequency and the determined inductance.

18. The welding-type power supply as defined in claim 11, wherein the control circuitry is configured to determine at least one of a pulse peak current time, a pulse peak current percentage, a pulse background current time, a pulse background current percentage, an AC waveform type, or a weld circuit inductance, wherein the control circuitry is configured to determine the amperage based on the frequency and at least one of the pulse peak current time, the pulse peak current percentage, the pulse background current time, the pulse background current percentage, the AC waveform type, or the weld circuit inductance.

19. The welding-type power supply as defined in claim 11, wherein each cycle of the pulse waveform comprises a peak current and a background current.

20. The welding-type power supply as defined in claim 11, wherein the control circuitry is configured to determine the amperage range of the AC waveform or the pulse waveform based on a selected one of a plurality of predetermined relationships between the frequency and the amperage parameter.

* * * * *